(12) United States Patent
Levinson et al.

(10) Patent No.: US 8,483,654 B2
(45) Date of Patent: *Jul. 9, 2013

(54) SYSTEM AND METHOD FOR REPORTING AND TRACKING INCIDENTS WITH A MOBILE DEVICE

(75) Inventors: Lawrence Levinson, Roslyn, NY (US); Deepinder Singh, East Windsor, NY (US)

(73) Assignee: Zap Group LLC, Cranbury, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/451,162

(22) Filed: Apr. 19, 2012

(65) Prior Publication Data

US 2013/0005294 A1  Jan. 3, 2013

Related U.S. Application Data

(60) Provisional application No. 61/502,724, filed on Jun. 29, 2011.

(51) Int. Cl.
*H04M 11/04* (2006.01)

(52) U.S. Cl.
USPC .................................. 455/404.2; 455/404.1

(58) Field of Classification Search
USPC ...................................................... 455/404.2
See application file for complete search history.

(56) References Cited

U.S. PATENT DOCUMENTS

| | | |
|---|---|---|
| 5,648,770 A | 7/1997 | Ross |
| 5,982,420 A | 11/1999 | Ratz |
| 7,308,246 B2 | 12/2007 | Yamazaki et al. |
| 7,444,588 B2 | 10/2008 | Hill et al. |
| 7,451,401 B2 | 11/2008 | Tanskanen et al. |
| 7,508,941 B1 | 3/2009 | O'Toole, Jr. et al. |
| 7,843,491 B2 | 11/2010 | Vallone et al. |

(Continued)

FOREIGN PATENT DOCUMENTS

| | | |
|---|---|---|
| RU | 2 018 867 C1 | 8/1994 |
| RU | 2 196 358 C2 | 1/2003 |
| RU | 36 315 U1 | 3/2004 |

OTHER PUBLICATIONS

United States Office Action dated Jun. 27, 2012 from related U.S. Appl. No. 13/451,200.

(Continued)

*Primary Examiner* — Melody Mehrpour
*Assistant Examiner* — Natasha Cosme
(74) *Attorney, Agent, or Firm* — Scully, Scott, Murphy & Presser, P.C.

(57) ABSTRACT

A novel system and method for enhancing people's personal safety and incident reporting is presented, wherein mobile devices are used to report and/or record both "911" type situations and non-emergency situations. Users of the invention can record, transmit, stream, upload and/or send information from a threatening situation to a dispatcher at an emergency management office or facility and to the user's safety group. The dispatcher can assess the situation and, if the situation warrants action, then the information can be forwarded to the appropriate first responders. The system geo-locates the user and allows integration of camera feeds in the user's vicinity. The inventive system and method enables a user to contact a dispatcher and also to alert the user's safety group. Four pieces of software facilitate video, audio, images and/or text medium of communication between the user-in-distress and the dispatcher, first responders and the user's safety group.

30 Claims, 19 Drawing Sheets

U.S. PATENT DOCUMENTS

| | | |
|---|---|---|
| 7,956,723 B2 | 6/2011 | Girgis et al. |
| 8,149,109 B2 | 4/2012 | Lontka |
| 2003/0098869 A1 | 5/2003 | Arnold et al. |
| 2003/0169185 A1 | 9/2003 | Taylor |
| 2005/0097135 A1 | 5/2005 | Epperson et al. |
| 2006/0000971 A1 | 1/2006 | Jones et al. |
| 2006/0276200 A1 | 12/2006 | Radhakrishnan et al. |
| 2008/0031426 A1* | 2/2008 | Weeks .................. 379/45 |
| 2008/0216139 A1 | 9/2008 | Liwerant et al. |
| 2008/0304628 A1 | 12/2008 | Rowe et al. |
| 2009/0044237 A1 | 2/2009 | Keiter |
| 2009/0150947 A1 | 6/2009 | Soderstrom |
| 2009/0284348 A1* | 11/2009 | Pfeffer ................. 340/7.3 |
| 2009/0300498 A1 | 12/2009 | Falchuk |
| 2009/0300530 A1 | 12/2009 | Falchuk |
| 2010/0099461 A1 | 4/2010 | Rahfaldt et al. |
| 2010/0229121 A1 | 9/2010 | Falchuk |
| 2010/0279649 A1 | 11/2010 | Thomas |
| 2011/0090334 A1 | 4/2011 | Hicks, III et al. |
| 2011/0099372 A1 | 4/2011 | Annapureddy et al. |
| 2011/0107220 A1 | 5/2011 | Perlman |
| 2011/0111728 A1* | 5/2011 | Ferguson et al. .......... 455/404.2 |
| 2011/0130112 A1 | 6/2011 | Saigh et al. |
| 2011/0230161 A1 | 9/2011 | Newman |
| 2012/0016952 A1 | 1/2012 | Watt |
| 2012/0052837 A1* | 3/2012 | Reich et al. ............. 455/404.2 |

OTHER PUBLICATIONS

United States Office Action dated Jun. 29, 2012 from related U.S. Appl. No. 13/451,089.
United States Office Action dated Dec. 4, 2012 from related U.S. Appl. No. 13/451,089.
United States Office Action dated Jan. 17, 2013 from related U.S. Appl. No. 13/451,200.
International Search Report together with the Written Opinion dated Nov. 29, 2012 from related application PCT/US 2012/042595.
International Search Report together with the Written Opinion dated Oct. 18, 2012 from related application PCT/US 2012/042598.
International Search Report together with the Written Opinion dated Sep. 20, 2012 from related application PCT/US 2012/042599.

* cited by examiner

SYSTEM AND METHOD FOR REPORTING AND TRACKING INCIDENTS WITH A MOBILE DEVICE

CROSS REFERENCE TO RELATED APPLICATIONS

The present invention claims the benefit of U.S. provisional patent application 61/502,724 filed Jun. 29, 2011, the entire contents and disclosure of which are incorporated herein by reference as if fully set forth herein.

This application is related to commonly-owned, co-pending U.S. patent application Ser. No. (28236) for SYSTEM AND METHOD FOR ASSIGNING CAMERAS AND CODES TO GEOGRAPHIC LOCATIONS AND GENERATING SECURITY ALERTS USING MOBILE PHONES AND OTHER DEVICES and U.S. patent application Ser. No. (28234) for SYSTEM AND METHOD FOR REAL TIME VIDEO STREAMING FROM A MOBILE DEVICE OR OTHER SOURCES THROUGH A SERVER TO A DESIGNATED GROUP AND TO ENABLE RESPONSES FROM THOSE RECIPIENTS, both filed on even date herewith, the entire contents and disclosure of which is expressly incorporated by reference herein as if fully set forth herein.

FIELD OF THE INVENTION

This invention relates generally to mobile device applications for reporting situations and/or incidents.

BACKGROUND OF THE INVENTION

In the United States, a "911" emergency system is a system for safety of its citizens. The system is designed to use telephones, either land lines or cellular, to report incidents that are emergency-type situations.

However, the US 911 system is limited to telephone calls only. A person in distress can telephone a 911-operator and report an emergency situation, such as an accident, illness, assault, etc. The person cannot provide photographs or video data or text data; only audio data can be communicated. In addition, this information can only be provided to the 911 operator, not to emergency services providers or others who could assist the person in distress. Therefore, there is a need for a system and method in which a mobile device can be used to report and monitor incidents, the reporting to include video, photographic, text and other data in addition to audio data. There is also a need for a system and method that allows a person in distress to communicate with emergency service providers such as first responders in addition to communicating with the 911 operator. There is a further need for a system that enables a social protection network with user safety groups and/or Samaritans who receive alerts from users in distress.

SUMMARY OF THE INVENTION

A system and method using a mobile device to report and monitor incidents that provides a solution to known problems is presented. The inventive system enhances the process of reporting an emergency situation by allowing a user to send audio (voice based), video, images (pictures) and text based data in addition to the voice based communication. The system also provides a method for the dispatchers and first responders to receive video, text, and/or audio information from the user reporting the incident and communication between the parties using text, audio and video. In addition to providing the first responders with the video on the incident, the invention also serves the purpose of a social protection system wherein users can upload video from dangerous situations and share the video live with their family and friends to make everyone involved aware of their situation. Further the system utilizes its database to identify cameras in the vicinity of the incident and/or cameras related to an incident. Therefore, when an incident is reported through the inventive system, the dispatcher can access the video feeds from the cameras in the vicinity of the incident.

The inventive system and method provides users with a software based application that can be installed on mobile devices. This software can be used to send information, including live video, audio, pictures and/or text from a "situation". The information is sent via the mobile device to a server from where it can be displayed live on a web site, forwarded to others pre-selected by the user, and/or sent to a dispatcher or first responder. The invention provides a dispatcher and/or first responders with a mechanism to assess the situation by viewing video and/or other information of the situation, live or after the incident has taken place. In one embodiment, an alert message, such as a text message, can be sent to Samaritan(s) in the area. In one embodiment, support may be provided for "If you see something—say something"-type situations where a suspicious person or activity can be reported to the authorities simply by streaming information to them.

A computer readable storage medium storing a program of instructions executable by a machine to perform one or more methods described herein also may be provided.

TERMINOLOGY

CALL: When a caller initiates the ZAPAPP to send out a distress signal, then he is placing a "Call". In this call, the parties involved can exchange information. Parties can include the user's Safety Group, Samaritans and/or a Dispatcher and/or First Responders. The call can be an Emergency Call or a non-Emergency Call such as reporting a flat tire to the user's Safety Group.

NON-EMERGENCY CALL: A call that is placed by the user using the ZAPAPP that is marked as a non-Emergency Call. The alert for this type of call is sent only to the Safety Group members of the calling user. An example of this can be a user walking in a dark alley or a user who has a flat tire in the middle of the night. For these types of calls, the alert is not sent out to the Dispatcher.

EMERGENCY CALL: A call that is placed by a user using the ZAPAPP that is marked as an Emergency Call. The Emergency Calls are designed to notify the Dispatcher about the situation.

CALLER/USER IN DISTRESS: A user who uses the inventive technology to send information from a situation using ZAPAPP from a mobile device.

DISPATCHER: Person, typically 911 operator, who receives a distress call and/or a person deemed to receive distress calls from users of the inventive application. Alternatively, the Dispatcher is a centralized office to handle dispatch and response to ZAP ALERTS.

FIRST RESPONDER: These are police, fire, EMT, Hazmat, SWAT, Anti Terrorism, Bomb Squad or any other agency, body or group, private or government owned, and/or other service providers who respond to 911 and/or distress emergencies.

GEO-LOCATION: Physical location for a mobile device, generally as determined from the device's GPS (global positioning system).

INCIDENT: If an alert is "ACCEPTED" by a Dispatcher, it becomes an incident. That is, if a Dispatcher, upon viewing the alert video sent out by the user in distress, acknowledges the alert as an emergency situation, then the alert becomes an incident.

INFORMATION: Information which is communicated between system components, such as video, audio, text, images and/or other data, such as data in encrypted form and data in unencrypted form. Generally information is the exchange of audio, video, image and/or text data between the parties involved in the call. All of the information is stored on a ZAP SERVER for a particular incident.

MOBILE DEVICE: These are devices, typically hardware, that can stream information via the internet or 2G/3G/4G or any other cellular networks to the ZAP SERVER. Examples of these types of devices can be an iPhone, iPad, Android®-based smartphones, Android® Notebook, Chrome book, Amazon® Kindle®, Blackberry® phones, tablet computers, laptop computers, or any other mobile device on which the ZAPAPP can be installed. These devices are not limited to any specific type of hardware or vendor or operating system, but will operate with any device generally considered to be a mobile device, that can connect to a network, transmit information to a server and receive information from a server. Typically, only software is provided to be installed on the mobile device, and the hardware is owned by the user.

SAMARITAN: Person who receives an alert from the ZAP SERVER by video and/or text and/or data and/or audio that an incident has been alerted by a user in the vicinity. The alert can be a text message with geo-location and/or other information.

SAFETY GROUP: A user can create a "safety group" of other users, typically friends and/or family, who are to be notified when the creating user initiates a distress signal. Each member of the Safety Group has a mobile device with ZAPAPP on it. The ZAP SERVER will send the alert to the Safety Group, and if it is an Emergency Call, will also send the alert to the Dispatcher. The Safety Group will receive the alert whether or not there is a Dispatcher, which has licensed the ZAP SYSTEM, in the vicinity. If the creating user is in a situation that is "potentially dangerous" but not an emergency situation, for example if the creating user is walking alone in a dark alley, or someone knocks on the door of the creating user at 3:00 AM, then the creating user can transmit the video from his mobile device via "ZAPAPP" to his pre-defined Safety Group. The Safety Group can view the video from the situation, know about the situation, and can alert the police, other authorities and/or other relevant people, if appropriate.

USER: Any one who has the "ZAPAPP" on his or her mobile device is a user.

ZAP SERVER: Hardware and/or software which manages the ZAP SYSTEM including all communications among the user, the Dispatcher, the First Responders, the Safety Group(s), and the Samaritans. ZAP SERVER receives and processes user alerts and maintains databases, such as a database of geo-locations, etc. ZAP SERVER has a processor and/or CPU.

ZAP CAMERA: A camera installed in the city or county by ZAP or a camera installed by the city or county or other party that can be accessed by the ZAP SYSTEM.

ZAP PROTECTED COUNTY: A County where the Dispatcher entity has licensed the ZAP911 system and the ZAP SYSTEM has been implemented. This would include providing the Dispatchers in the county with ZAP DISPATCH software and the FIRST RESPONDERS in the county with the FIRST RESPONDER software/hardware.

NON-ZAP PROTECTED COUNTY: A county where the ZAP SYSTEM has not been implemented. The Dispatchers in this county have access to limited information about an incident via a web site provided by ZAP. The DISPATCHERS and FIRST RESPONDERS are not provided with any software or hardware in such counties.

BRIEF DESCRIPTION OF THE DRAWINGS

The invention is further described in the detailed description that follows, by reference to the noted drawings by way of non-limiting illustrative embodiments of the invention, in which like reference numerals represent similar parts throughout the drawings. As should be understood, however, the invention is not limited to the precise arrangements and instrumentalities shown. In the drawings.

DETAILED DESCRIPTION

A novel system and method for enhancing people's personal safety and incident reporting is presented. The system, hereinafter "ZAP", is designed to use mobile devices to report incidents that are "911" type situations, and also to report or record non-emergency situations. The invention allows its users to record, transmit, stream, upload and/or send information from a threatening situation to a Dispatcher at an emergency management office or facility and to the user's Safety Group. The Dispatcher can assess the situation and, if the situation warrants action, then the information can be forwarded to the appropriate personnel, e.g., the First Responders, such as police, fire, hazmat, bomb squad, etc. The system also allows integration of video camera feeds from ZAP CAMERAS into the ZAP DISPATCH and/or ZAP FIRST RESPONDER software.

The inventive system and method enables a user to contact a Dispatcher and obtain assistance in an emergency situation and also to alert his or her Safety Group of the situation whether or not it is an emergency. The emergency may be a medical emergency, a situation caused by an accident, a security breach, etc. The user may communicate with the Dispatcher over a cellular and/or internet network using the inventive application.

The invention is centered around four pieces of software: ZAPAPP, ZAP DISPATCH, ZAP FIRST RESPONDER, and ZAP SERVER. These pieces work together to facilitate an end-to-end video, audio, images and/or text medium of communication between the user-in-distress and the Dispatcher or First Responder and/or between the user and his Safety Group.

Figure 1:
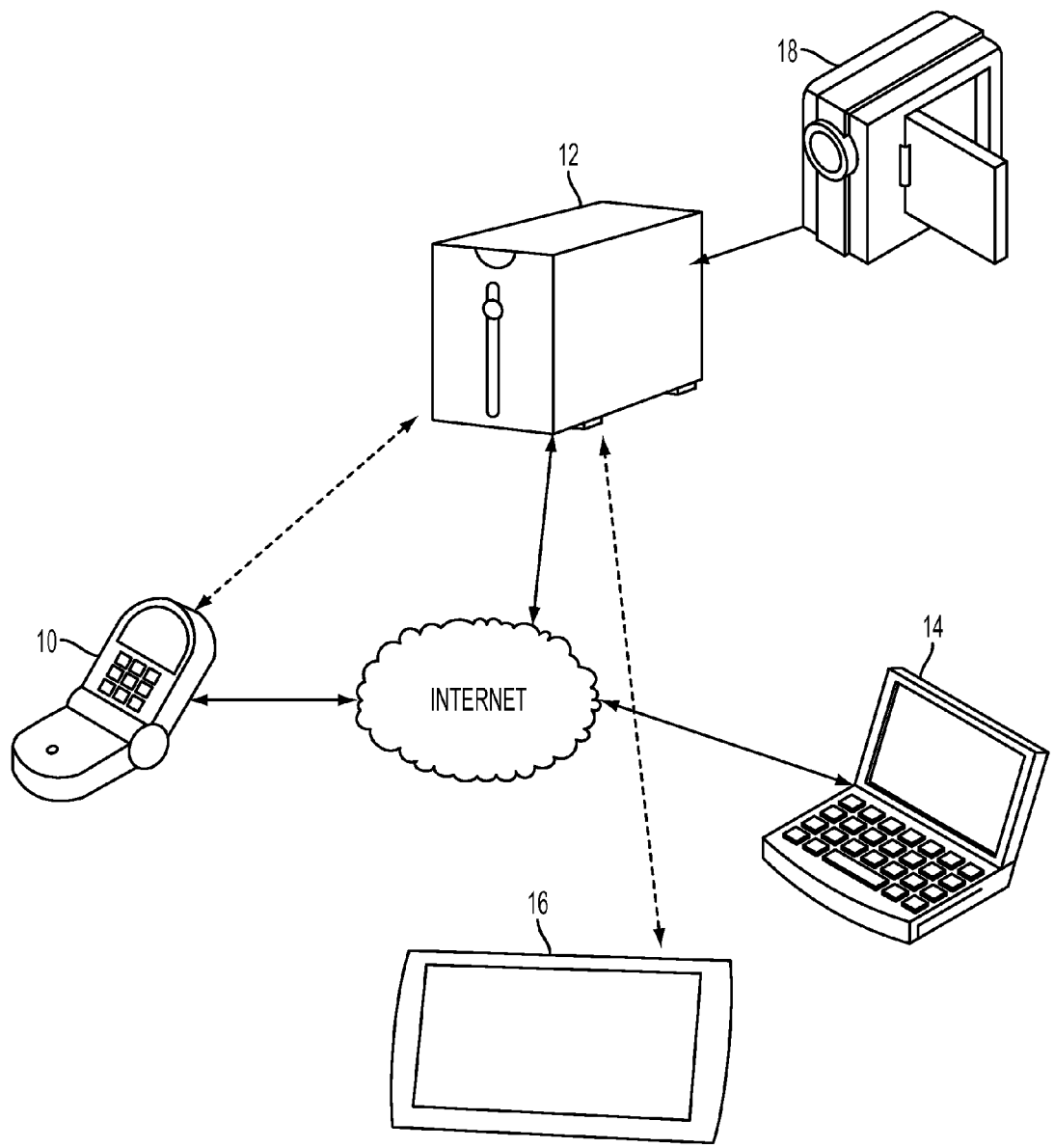
FIG. 1 shows the components of the inventive system in an exemplary embodiment.

FIG. 1 shows the components of the inventive system in an exemplary embodiment. As shown in FIG. 1, the system can include a mobile device 10, a ZAP SERVER 12, ZAP DISPATCH software located on a computing device 14, one or more First Responder devices 16 and ZAP CAMERAS 18 installed by ZAP or accessible by the ZAP SERVER. These are cameras installed at public locations in the county. The ZAP SERVER will identify ZAP CAMERAS in the vicinity of an incident and can direct their videos to the Dispatcher. The components can communicate via the Internet, as shown with the solid lines. In addition or in the alternative, communication can occur via cellular networks (2G/3G/4G or any other type of cellular network available), as shown with the dotted lines. Specifically, the ZAP SERVER 12 can bi-directionally communicate with one or more of the mobile devices 10 via the internet or cellular networks, with ZAP DISPATCH software 14 via the internet and with ZAP FIRST RESPONDER mobile device(s) 16 via the cellular networks.

The ZAP DISPATCH Software 14 can be implemented in two ways. One is via software designed for this purpose installed on the computers of the Dispatchers. This is the case in a ZAP PROTECTED COUNTY where the software is provided by ZAP to the Dispatcher. Typically under a license agreement, a web based system may also be provided to the Dispatcher. The other is via a web based system that can be accessed by the Dispatcher from anywhere. This is the case in a non-ZAP PROTECTED COUNTY. In such cases the Dispatcher can access limited information about the incident via a web page provided by ZAP.

The First Responder devices 16 include software that can be implemented in a variety of ways, including as software that gets installed on a mobile device provided to the First Responder or as software that can be installed on a computer, laptop or other such device, and/or as a web based system, e.g., web site, that can be accessed via the laptop or computer devices 16. This hardware and/or software is provided to the FIRST RESPONDERS in a ZAP PROTECTED COUNTY only.

ZAPAPP, a novel software application, is software that a user can download and install on his or her mobile device 10. ZAPAPP provides the user functionality and interface with other components. In one embodiment, this software can be downloaded from an online repository, such as "Apple® online app store", "Android® store", the ZAP WEB SITE, etc.

Figure 2:
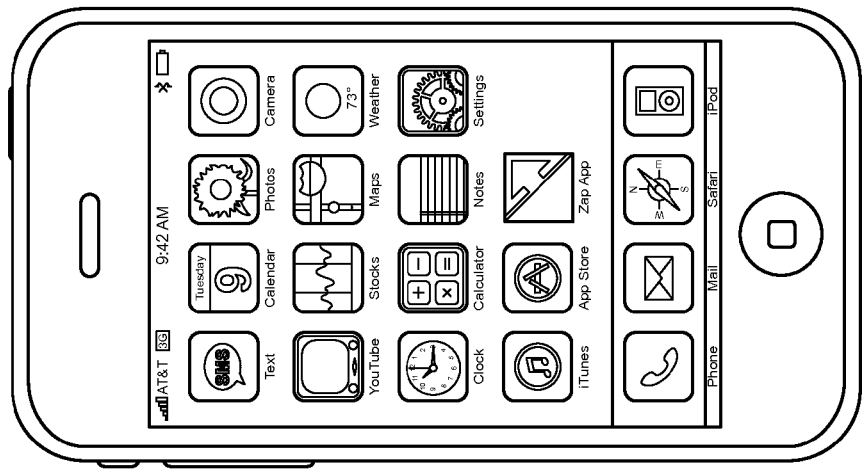
FIG. 2 shows an exemplary mobile device screen with ZAPAPP installed and a ZAPAPP icon displayed on the screen.

FIG. 2 shows an exemplary mobile device screen with ZAPAPP installed and a ZAPAPP icon displayed thereon.

ZAPAPP allows a user to perform the following functions: Register with the ZAP SYSTEM, Create a Safety Group, Sign up for Samaritans Program, Make emergency or non-Emergency Calls, Stream Video and/or send images (pictures), Receive alerts, Provide geo-location to a server, Communicate with the Dispatcher and/or First Responder(s) using voice or text data, Get status updates when a call is in progress, and Tag calls. ZAPAPP can receive information from the ZAP SERVER, such as a Safety Group alert and/or video stream.

Figure 3:
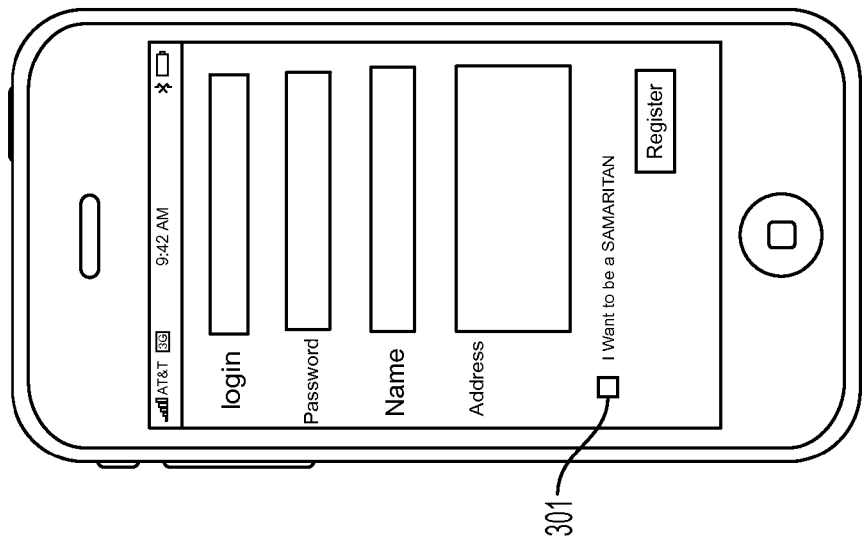
FIG. 3 is an exemplary screen illustrating one embodiment of ZAPAPP registration.

ZAPAPP allows a user to register with the ZAP SYSTEM. In the ZAP SYSTEM each user has a login id ("log-in") and password that uniquely identifies that user in the system. Each mobile device has a unique device id which is registered and maintained in the ZAP SYSTEM database. FIG. 3 is an exemplary screen illustrating ZAPAPP registration. Other screen formats can also be used.

Figure 4:
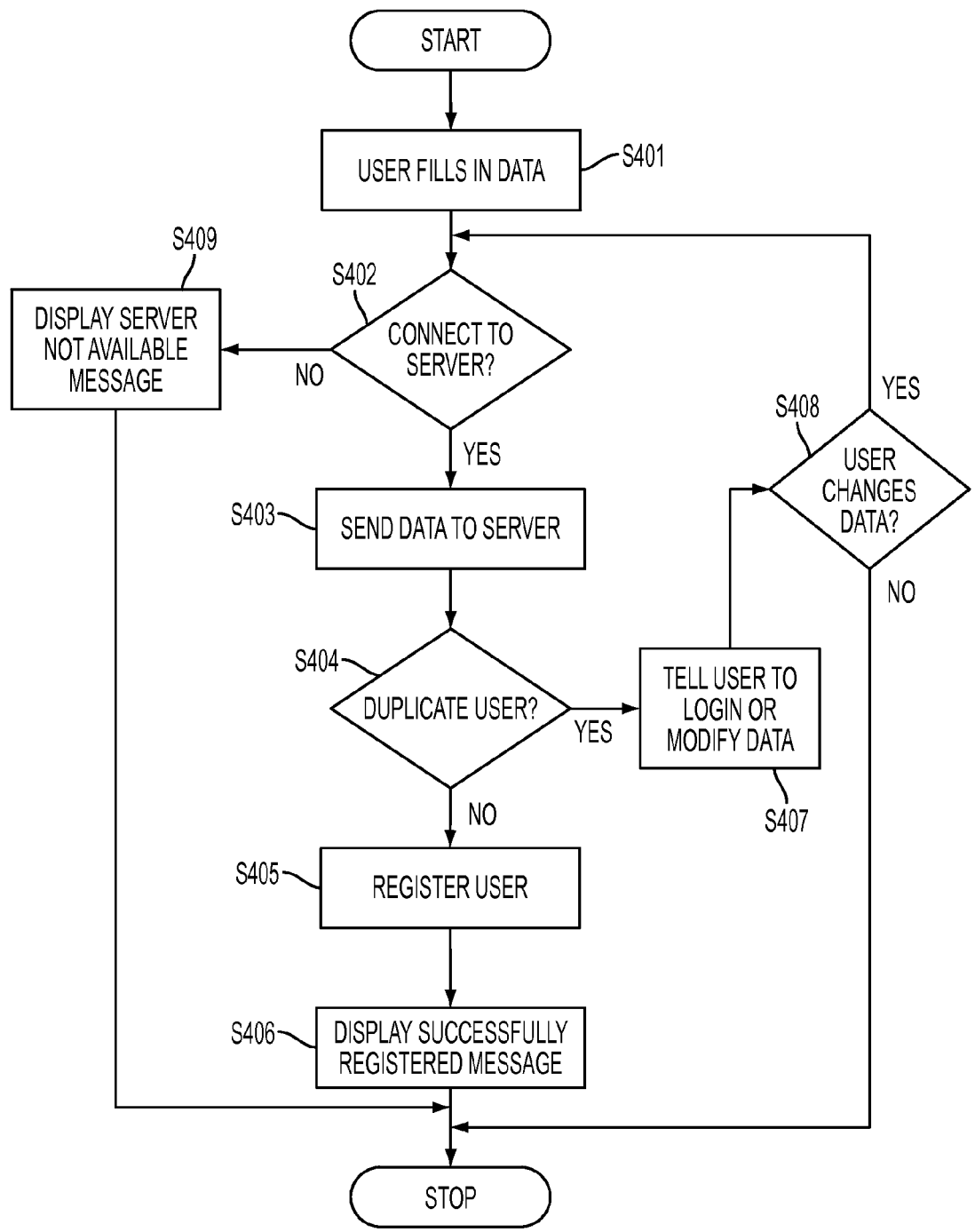
FIG. 4 is a flow diagram of the registration process.

FIG. 4 is a flow diagram of the registration process. In step S401, the user fills in data, such as a login, e.g., user name, password, name and address. Additional data can include User Home/Work Address, User Telephone Number, User Emergency Contact Name(s), User Emergency Contact Phone Number(s), and/or User Emergency Notes. Not all of this data is required for registration. If the user is connected to the ZAP SERVER (S402=YES), then the data is sent to the server in step S403. If the user is not a duplicate (S404=NO), then the user is registered in the system in step S405. A message indicating that the user has successfully registered is displayed in step S406 and the registration process is complete.

If the user is a duplicate (S404=YES), then the user is instructed to either login or to modify the user name in step S407. If the user changes the data, e.g., modifies the user name, (5408=YES), then processing continues at 5402. Otherwise (5408=NO), processing terminates.

If the user is not connected to the server (S402=NO), then a message indicating that the server is not available is displayed and processing terminates.

The ZAPAPP allows a user to create a Safety Group, that is, a group of ZAP users, e.g., friends and/or family of the user, who can be sent an alert when a user makes an Emergency or a non-Emergency Call. When a member of the Safety Group clicks on or accepts the alert, he sees what is being streamed from the mobile device of the user. The video stream alert to the Safety Group will indicate whether or not the Dispatcher has received the alert from the user and is managing the alert as an incident. If the alert to the Safety Group indicates there is no Dispatcher involved, or the Dispatcher has rejected the user alert, or the Dispatcher has not elevated the user alert to an incident, then one or more members of the Safety Group can initiate a call to 911 when he or she feels that user's environment or situation warrants such a call.

As an example, if someone knocks on a user's the door in the middle of the night, then the user can send out an alert, e.g., a non-Emergency Call, that can be received by the Safety Group. The users in the Safety Group can view the video of what is going on in the user's environment and if the situation turns hostile or unsafe, then 911 can be called or alerted by anyone in the Safety Group. Since video is recorded on the ZAP SERVER from the beginning, the Dispatcher can access the entire video regardless of when he or she is notified.

A user can be added to another user's Safety Group by searching the ZAP DATABASE for the desired user based on name, phone number or login id. Once selected, a request is sent to the selected user who can then accept the incoming request to be part of another's Safety Group, or deny the request. Accepting the request adds the selected user to the other user's Safety Group. Denying the request results in no action being taken.

Figure 5:
FIG. 5 is an exemplary screen of a user's Safety Group.

FIG. 5 is an exemplary screen of a user's Safety Group. As shown, the screen displays the current members of the Safety Group, pending requests to other potential members, and requests from system users to join their Safety Groups. The user can add more members to his or her Safety Group by clicking on the "Add More Users" button.

Figure 6A:
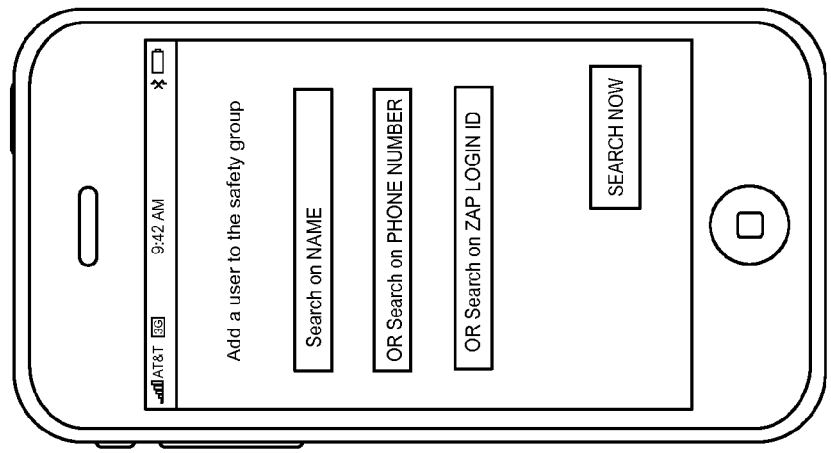
FIG. 6A is an exemplary screen showing searching for a specific user to be added to a user's Safety Group.
Figure 6C:
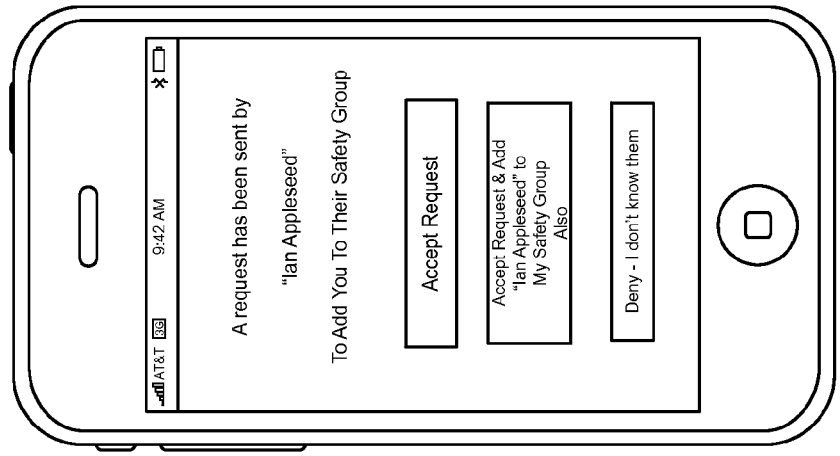
FIG. 6C is an exemplary screen showing receiving a request to be added to a user's Safety Group.
Figure 6B:
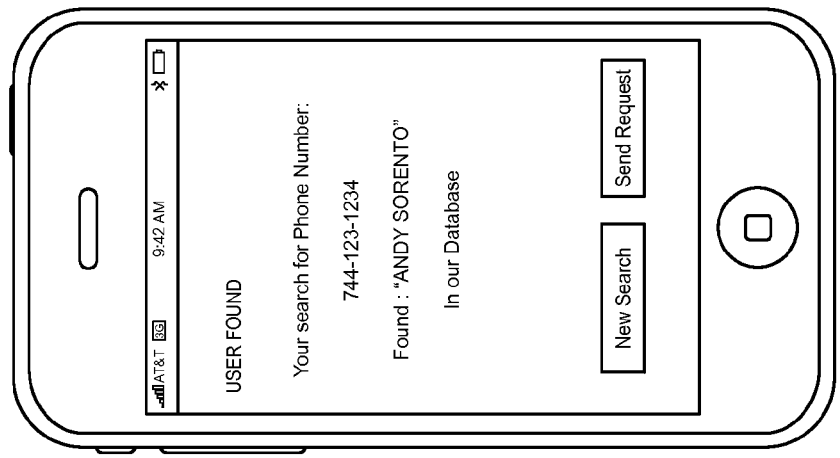
FIG. 6B is an exemplary screen showing search results for a specific user to be added to a user's Safety Group.

FIGS. 6A, 6B and 6C show exemplary screens employed when adding new members to a user's Safety Group. FIG. 6A shows searching the ZAP DATABASE of users for a specific user according to Name, Phone Number or login id. The user enters one of Name, Phone Number or login id in the appropriate area of the screen and clicks on "Search Now" to begin the search. FIG. 6B shows the search results, e.g., "User Found". If this is the desired ZAP DATABASE member, the user can click on "Send Request" to ask the member to join the user's Safety Group. Otherwise, the user can click on "New Search" to initiate a new search. FIG. 6C shows the screen displayed when the "Send Request" is clicked on the screen in FIG. 6B. As shown in FIG. 6C, the member receives a request that indicates the name of the user requesting that the member join the user's Safety Group, and the member can choose one of three options. The member can accept the request, by clicking on "Accept Request" or deny the request by clicking "Deny—I don't know them". In addition, the member can accept the request and also request that the user join the member's Safety Group by clicking "Accept Request & Add "USER" to My Safety Group". Other screen formats can be used to perform these functions.

When a situation in which a user becomes a user-in-distress occurs, depending on whether the user makes an Emergency or a non-Emergency Call, the ZAPAPP can perform the following operations. If the user has specified that the call is an Emergency Call, e.g., by clicking or tapping the emergency box, the ZAP SERVER will determine whether the user is located in a ZAP PROTECTED COUNTY or a non-ZAP PROTECTED COUNTY. The distress signal will include the user's geo-location, captured by ZAPAPP from the user's mobile device. When the distress signal is sent out or transmitted, the ZAP SERVER determines the location of the user-in-distress and if the call is made from a ZAP PROTECTED COUNTY then the ZAP SERVER routes the call to the nearest Dispatcher. For a NON ZAP PROTECTED COUNTY, since there is no Dispatcher, the alert is sent by the server only to the Safety Group members. If the user has specified that the call is a non-Emergency Call, by clicking or tapping the non-emergency box, then the alert is sent by ZAP SERVER only to the user's Safety Group members.

The user can stream information, such as video, audio, images, text and other data or a combination thereof, to his Safety Group and/or the Dispatcher. ZAPAPP typically uses the built-in camera in the mobile device to capture the video. In situations where the user does not have a high speed connection available, ZAPAPP will send pictures. This process generally occurs in the background. The user points the camera in the direction of the incident and ZAPAPP basically captures the "view" of the camera on the mobile device and streams this view in video format to ZAP SERVER. The format can be H.264, and can vary from device to device. The video is sent to the server using HTTP, FTP, RTP, RTMP, RTSP or any other streaming protocol as appropriate.

This transmission can be adjusted in accordance with the bandwidth available to transmit the data when the call is made. For example, if the bandwidth is good, then video-color data is streamed. If the bandwidth is medium, then a lower frame rate video is sent. If the bandwidth is less than medium, then gray scale video is sent. If the bandwidth is minimal, then the only data sent is images that are taken every two to five seconds and uploaded to the server for transmission to the appropriate devices.

ZAPAPP has built-in capabilities to receive alerts from the user or ZAP SERVER. The alert can be sent by one or more of the following methods. PUSH notification can be used to send messages to mobile devices. This technology is typically deployed to send alerts to users of APPLE® and ANDROID®-based devices. A member of the user-in-distress' Safety Group can get an alert via PUSH notification or its equivalent technology on different devices. A Short Message Service (SMS) message is sent along with the PUSH notification.

When the user makes a call from a ZAP PROTECTED COUNTY, the Dispatcher receives the alert directly on his computer. This alert is generally sent using HTTP protocol and not PUSH notification, since this alert is being sent to a computer device and not a mobile device.

Figure 7:
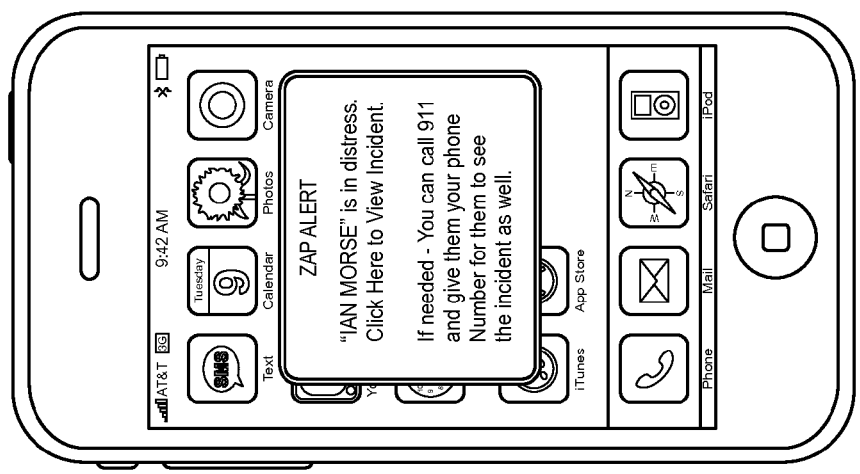
FIG. 7 is an exemplary screen of a Safety Group user receiving an alert.

FIG. 7 shows a Safety Group screen receiving an alert in an exemplary embodiment. Other screen displays may be used. FIG. 7 shows the situation where the county is not a ZAP PROTECTED COUNTY. Each member of the user-in-distress' Safety Group receives an alert message of "ZAP ALERT 'Ian Morse' is in distress . . . Click here to view incident . . . " The Safety Group member can click to begin video streaming the user information via the ZAP SERVER.

Figure 8:
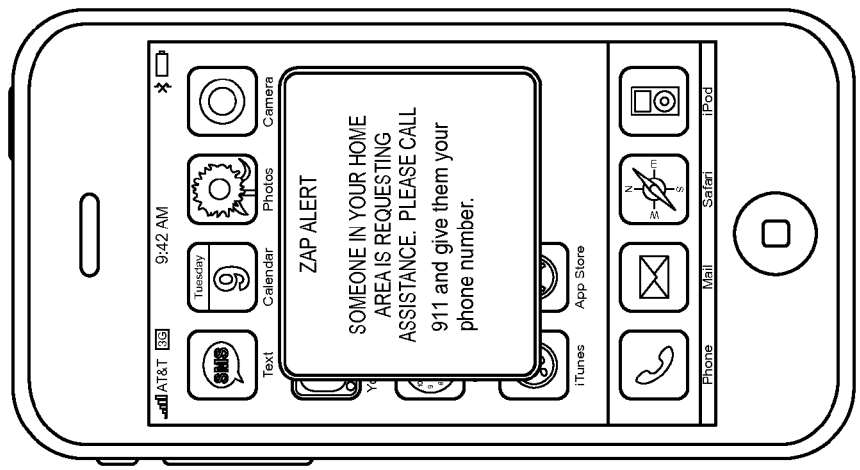
FIG. 8 is an exemplary screen of a Samaritan receiving an alert.

FIG. 8 shows a Samaritan screen receiving an alert in an exemplary embodiment. Other screen displays may be used. As shown in FIG. 8, a Samaritan who is registered in the geo-location of the user-in-distress in a non-ZAP PROTECTED COUNTY will receive an alert message of "ZAP ALERT Someone in your home area is requesting assistance . . . please call 911". ZAP does not keep a geo-location record of the mobile phones carried by Samaritans.

Once the user and his mobile device are registered, if the user dials 911 via his mobile device but not through ZAPAPP, the ZAPAPP recognizes the dialed number and gives the user the option to stream video to the ZAP SERVER.

Figure 9:
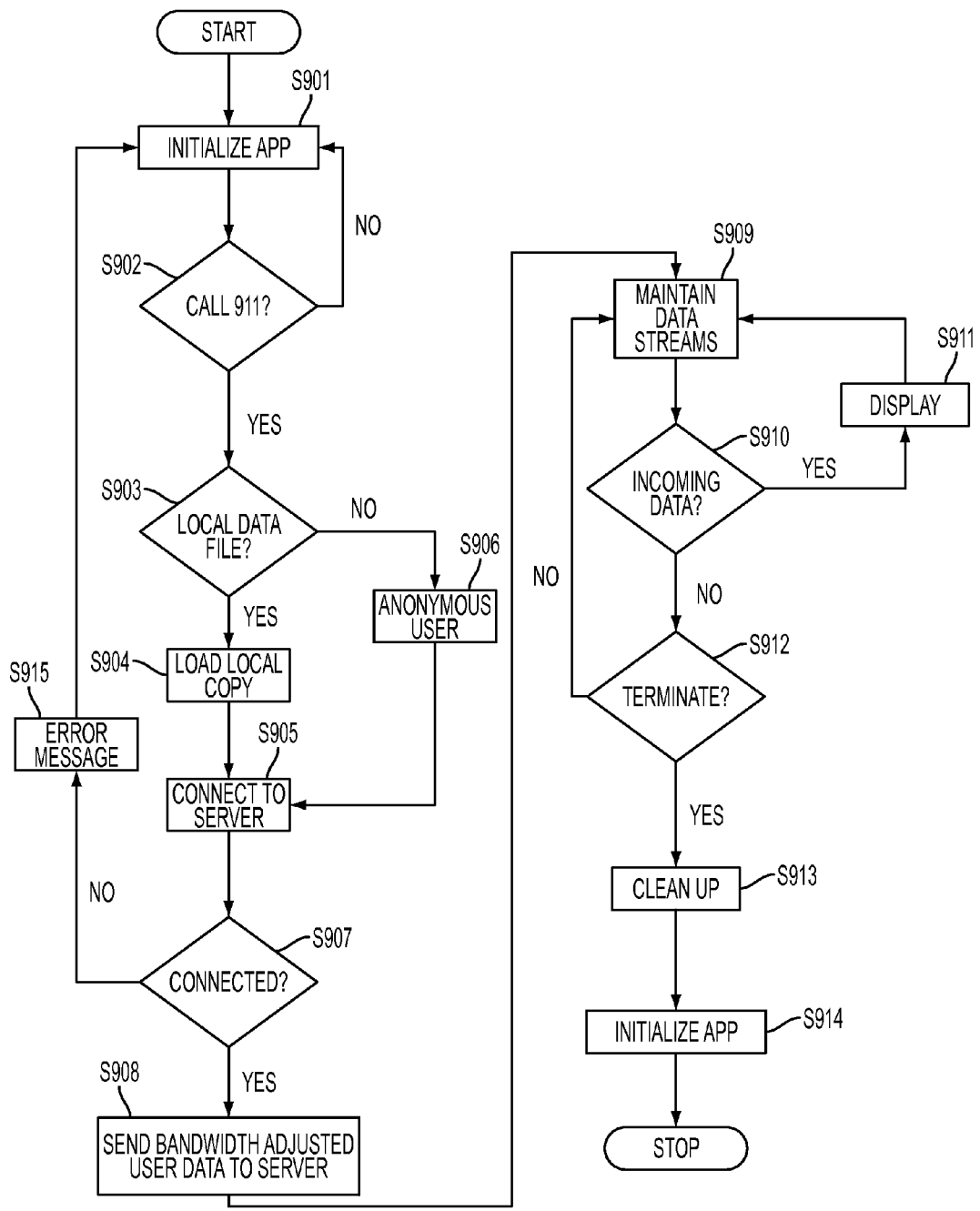
FIG. 9 is a flow diagram of how ZAPAPP reports a distress situation in one embodiment.

FIG. 9 is a flow diagram of ZAPAPP reporting a distress situation, for example, "Sending out a distress signal". As shown in FIG. 9, in step S901, the App is initialized. If a distress call is made (S902=YES), then the availability of local data is determined. Local data file is a file that is stored on the mobile device of the user that contains the login id of the user to identify the user in the ZAP SYSTEM. If no such file exists then that would mean that the user is not yet registered with ZAP. However, if the user is trying to make a distress call, the ZAP SYSTEM does not prevent him from sending out the distress signal. The distress signal is still sent out and video related to this signal is still received by the ZAP SERVER, the only difference is that this is done in anonymous mode. Anonymous mode is where the user is not identified in the system. If there is a local data file (S903=YES), the local copy is loaded in step S904. Next, connect to the server in step S905. Also, if there is no local data file (S903=NO), anonymous user is assumed at step S906 and processing continues at step S905. If a connection is made (S907=YES), then Bandwidth adjusted user data is sent to the server in step S908, and data streams are maintained at step S909. If there is incoming data (S910=YES), display the data at step S911 and continue processing at step S909.

If there is no incoming data (S910=NO), then determine whether to terminate. If terminate is yes (S912=YES), then clean up is performed in step S913 and initialize App is performed in step S914.

Otherwise, if no connection is made (S907=NO), an error message is produced in step S915 and processing continues at 5901.

When a user makes an Emergency or non-Emergency Call using ZAPAPP, it contacts the server. Typically the server listens for incoming alerts. When the server receives an incoming alert, the server authenticates the user and validates the caller. In addition, the server determines the Geo-Location of the caller and forwards the alert to the Safety Group and to the Dispatcher nearest to the caller, based on Geo-Location for a ZAP PROTECTED COUNTY. If the Dispatcher rejects the call, the server sends an appropriate message back to the caller and continues recording until the user terminates the call.

Figure 10:
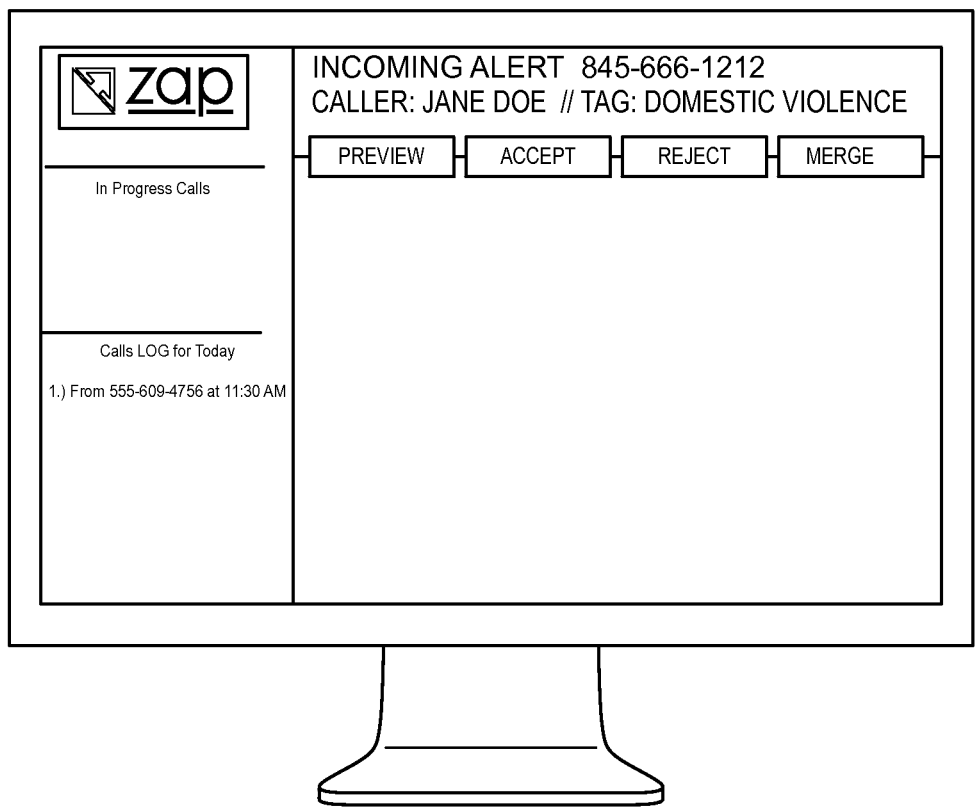
FIG. 10 is an exemplary screen of a Dispatcher receiving an alert via the ZAP DISPATCH software in a ZAP PROTECTED COUNTY.

FIG. 10 shows the Dispatcher receiving an alert on the ZAP DISPATCH software. FIG. 10 is an example screen from the ZAP DISPATCH software. When a user makes an Emergency Call in this embodiment, the Dispatcher receives a message on his computer screen of an incoming alert. The message can include the user's phone number, name and a tag for the distress signal. Tag is discussed in more detail below. The Dispatcher can choose to preview, accept, reject or merge the call. FIG. 10 shows these options as buttons on the screen which can be clicked. Clicking the preview button allows the Dispatcher to view the live video being transmitted by the caller with an option to view the video from the beginning.

The caller can receive information from the Dispatcher. ZAPAPP also allows for the information to be sent and received from the First Responders. ZAPAPP may not receive information if the bandwidth to receive it is not available. ZAPAPP may receive incoming information at a lower frame rate to preserve the bandwidth required to send video out.

ZAPAPP may provide visual alerts to the user that the call has been accepted or rejected by a Dispatcher. ZAPAPP may also provide visual alerts to the user that a First Responder is responding to the call.

Figure 11:
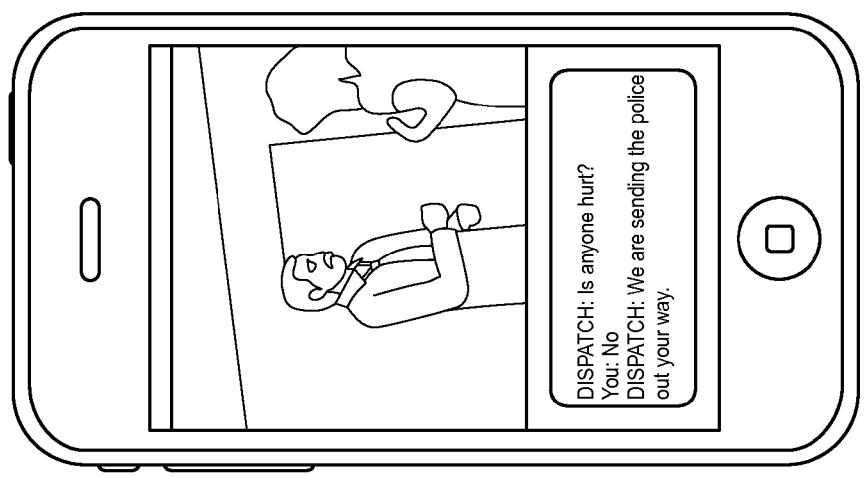
FIG. 11 is an exemplary screen of a text based communication between a user and Dispatcher.

The user can communicate with the Dispatcher using ZAPAPP; this communication can be voice or text based. FIG. 11 shows a text based communication. As shown in FIG. 11, the Dispatcher texts the user, e.g., "DISPATCH: Is anyone hurt", and the user responds with a text message of "No". The Dispatcher responds "We are sending the police out your way". For voice data, the user speaks into the mobile device and his or her voice is transmitted to the Dispatcher using IP packets over the 3G, 4G or any other cellular network via HTTP, FTP, RTP, RTSP, RTMP or any other protocol as known to those skilled in the art.

Figure 12:
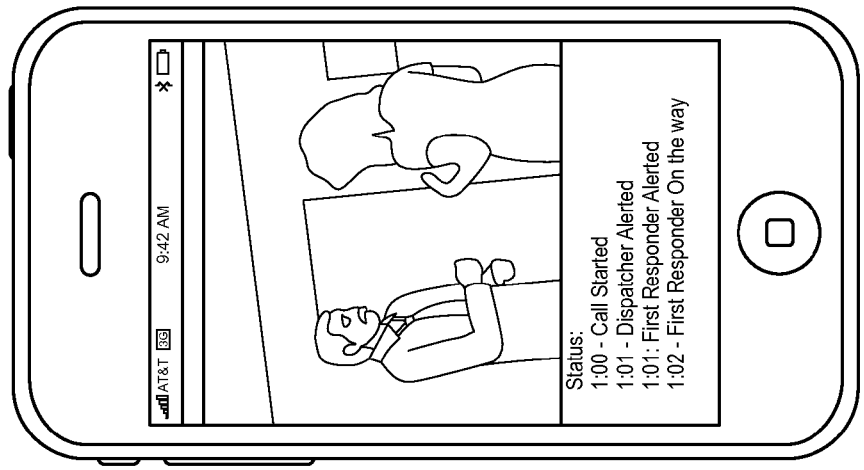
FIG. 12 shows an exemplary screen of how call status is provided to the user.

FIG. 12 shows an exemplary screen of how call status is provided. ZAPAPP shows the user the status of his or her call at all times. Examples of call status can include Alert sent to Safety Group, Alert sent to Dispatcher, Dispatcher previewing video, Dispatcher accepted the incident, First Responder alerted, First Responder on his way. These status signals, as well as others not listed, keep the user appraised at all times about the status of his call. These signals can be icons as well as or instead of text. The status signals can vary by whether the county is ZAP PROTECTED or not.

Figure 13:
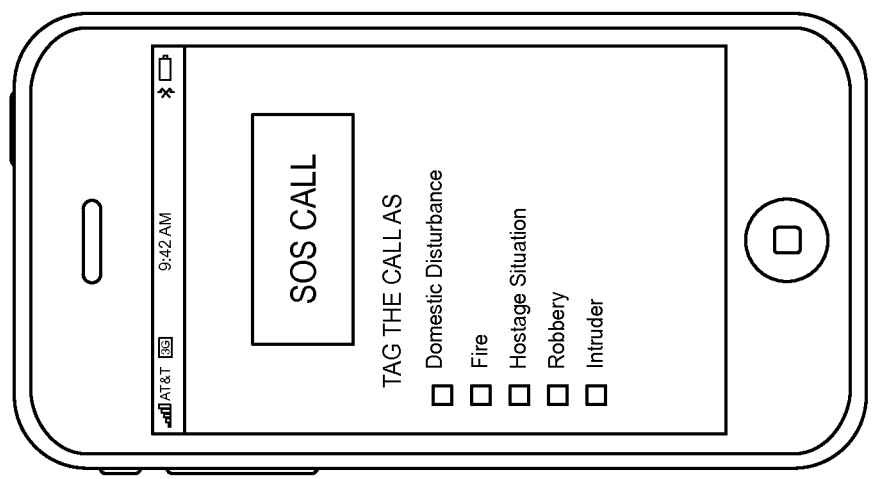
FIG. 13 is an exemplary screen illustrating tagging a call.

ZAPAPP allows the user to "tag" the call, as mentioned above, to identify the type of situation the user is in. Tags can include Domestic Disturbance, Accident, Fire, Robbery, Intruder, Hostage Situation, Hazardous Material Spill, Terrorist Activity, General Crime Situation, etc. FIG. 13 shows an exemplary screen for tagging the call. As shown in FIG. 13, after clicking the SOS call, a list of tags is displayed; the user can choose the tag from this list.

ZAP SERVER software binds the components together. Typically this software is installed on servers that are owned and operated by ZAP, but third party operations, e.g., cloud servers, can also host ZAP SERVER.

Functions performed by ZAP SERVER can include listening for incoming distress calls from ZAPAPP, sending alerts to Safety Group members and Samaritans, sending alerts to 911 operator or Dispatcher, web site hosting, receiving incoming video, picture, text and/or audio data regarding an incident, streaming video, maintaining geo-locations of First Responders, maintaining First Responder engagement records, mapping the incident for directions, maintaining a database of all users and incidents, keeping logs and identifying ZAP CAMERAS in the vicinity of reported incidents and directing video feeds from these ZAP CAMERAS to the Dispatcher. These features are described in more detail below.

ZAP SERVER listens for incoming distress signals or alerts. ZAPAPP can send a signal, e.g., an alert, to the ZAP SERVER when a distress call originates from a mobile device running ZAPAPP. ZAP SERVER listens on a pre-designed port on the server (say port Number 35678 as an example). ZAPAPP can send an alert to that port (port 35678 in this example). An alert is sent to the server by the ZAPAPP by sending certain information in a certain format to the port. For example, the format can be XML, JSON, or TEXT format. The information may or may not be encrypted based on the security convention followed. This communication, e.g., sending an alert, can be simple HTTP based or via a Socket Call.

The alert sent by ZAPAPP to ZAP SERVER can contain the login id of the calling user, to identify the caller, and the geo-location co-ordinates of the caller. Additional information can also be included. As soon as the ZAP SERVER gets this information, it creates a folder on the storage for storing the video, audio and text chat files and sends that folder information, e.g., folder identification or storage location for the information for this incident, back to ZAPAPP. This creates a session between ZAPAPP and ZAP SERVER. The ZAP SERVER then expects video files to be uploaded against this incident. The folder created on the storage by the ZAP SERVER provides the storage location, which is also recorded in the database, to set up a pointer between the incident and its storage location.

Figure 14:
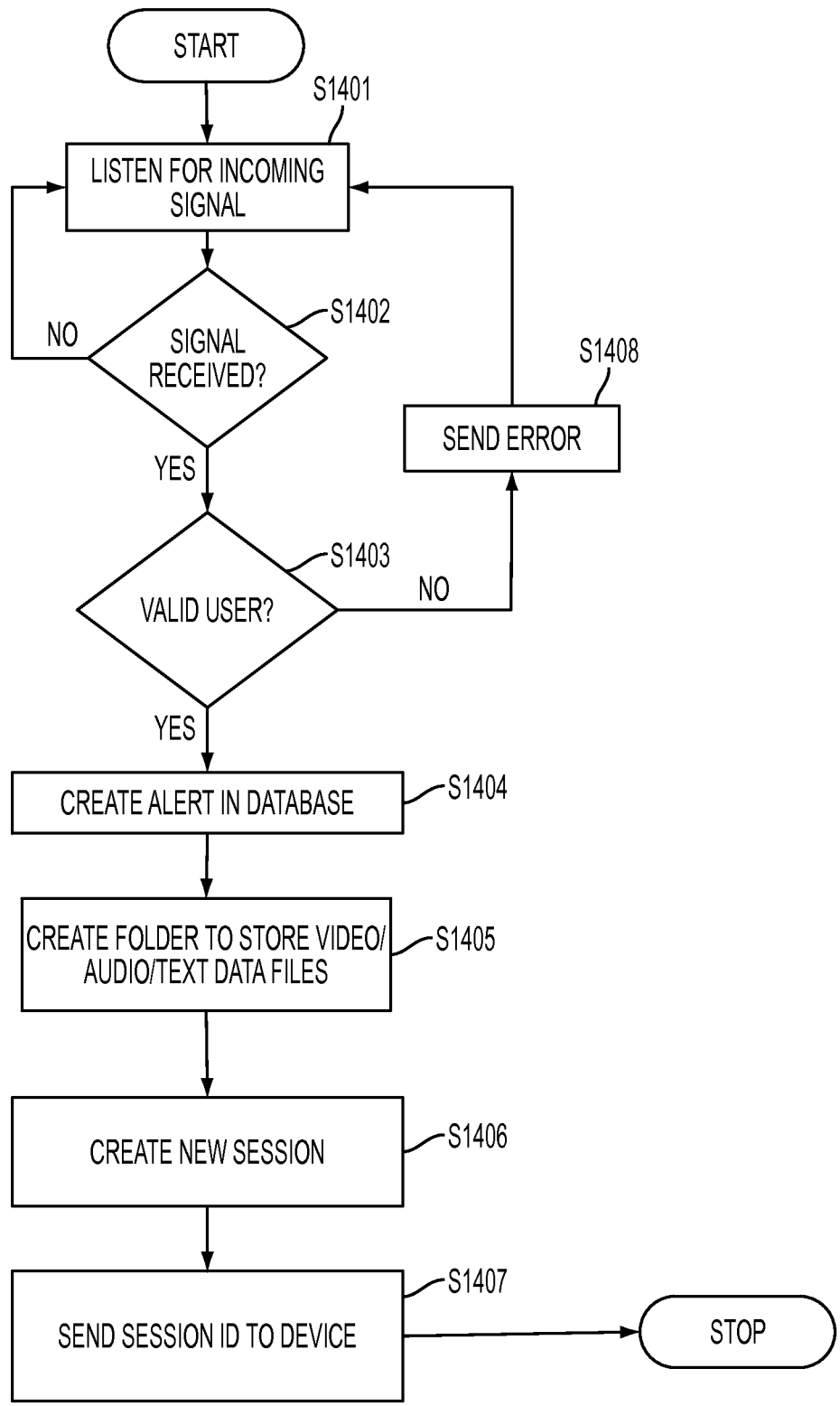
FIG. 14 is a flow diagram of listening for incoming distress calls.

FIG. 14 is a flow diagram of listening for incoming distress calls. In step S1401, the server listens for an incoming signal. If a signal is received (S1402=YES) and if the user is valid (S1403=YES), then at step S1404, create an alert in the database. At step S1405, create a folder to store video/audio/text data, etc., files for this alert. At step S1406, start a new session. At step S1407, send the session id to the device from which the incoming signal was received.

If there is no incoming signal (S1402=NO), then continue listening at step S1401. If there is an incoming signal (S1402=YES) but the user is not valid (S1403=NO), then produce an error message at step S1408 and continue processing at S1401.

As soon as the server begins receiving video files, typically via FTP, RTP, RTSP, RTMP, HTTP or secure versions of these protocols or any other protocols available to ZAP for transferring files over the internet or 3G, 4G or other cellular networks, the server sends out an alert to the applicable Dispatcher for the geo-location of the user if the county is a ZAP PROTECTED COUNTY, and to all the members in the Safety Group of the calling user. The Safety Group members are stored in the database at the ZAP SERVER and determined based on the calling user's login.

Figure 15:
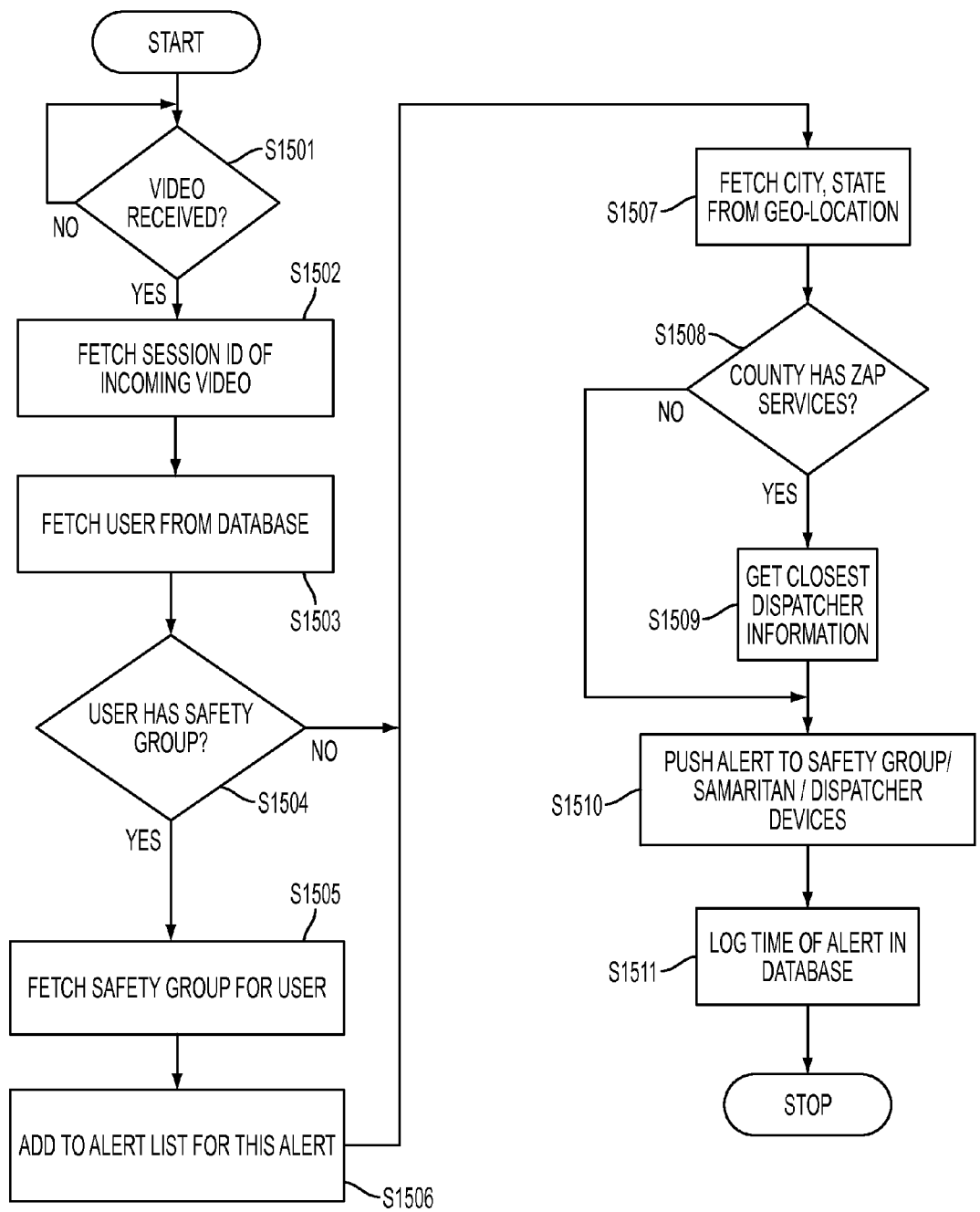
FIG. 15 is a flow diagram of sending alerts to Safety Group members.

FIG. 15 is a flow diagram of sending alerts to Safety Group members and to Dispatchers. If video or audio or picture or text data is received for a distress call (S1501=YES), then ZAP SERVER fetches a session id of the call related to this incoming information at step S1502. At step S1503, the user corresponding to the session id is fetched or retrieved from the database. If the user has a Safety Group (S1504=YES), then at step S1505, this Safety Group is fetched and at step S1506 this alert is added to the alert list.

If the user does not have a Safety Group (S1504=NO), or after steps S1505 and S1506 are performed, processing continues at step S1507 and the city and state are fetched, based on the geo-location where the call is coming in from. If the county where the call is originating (as per the geo-location) is a ZAP PROTECTED COUNTY (S1508=YES), then the closest Dispatcher information is retrieved in step S1509. At step S1510, a PUSH alert is sent to the Safety Group members and an alert via socket connection is sent to the ZAP DISPATCH software. At step S1511, the time of the alert is logged into the database and the processing stops.

If the county is a non-ZAP PROTECTED COUNTY (S1508=NO), then processing continues at step S1510.

In a non-emergency situation, that is when the user makes a non-Emergency Call, if anyone in the Safety Group or the caller himself wishes to send an alert to the Dispatchers then he can do so by clicking on and/or pressing the appropriate button on the interface provided in the ZAPAPP. This embodiment is only available in ZAP PROTECTED COUNTIES, that is where the PSAP or other 911 system operator has licensed the ZAP SYSTEM and the ZAP SYSTEM has been deployed to provide software and hardware to the Dispatchers and First Responders. For non-ZAP PROTECTED COUNTIES, the only option is to call 911 using the regular phone line and let the Dispatcher know the phone number of the caller.

As an example, in this non-emergency situation, when a user sends out a non-emergency distress signal that goes to his Safety Group, someone from the Safety Group can inform the 911 operator or Dispatcher if the situation appears dangerous by clicking on or pressing the appropriate button from his screen. When the button is pressed from the mobile device of the Safety Group member, it sends a signal regarding this incident to the ZAP SERVER. The signal is sent via HTTP using the 3G, 4G or any other cellular networks or normal internet networks if one is available. When the ZAP SERVER receives such a signal, it in turn determines the geo-location of the incident and sends an alert to the Dispatcher who is nearest to the geo-location of the user-in-distress. The alert then shows up on the screen of the Dispatcher in the ZAP DISPATCH software as shown in FIG. 11. This is available only in ZAP PROTECTED COUNTIES.

The information, e.g., data in the form of video, pictures, audio or text, that is received on the server from ZAPAPP, ZAP DISPATCH and/or ZAP FIRST RESPONDER, is sent to the server and permanently stored there for log purposes. The data is made available to the First Responders, law enforcement agencies, and/or Dispatchers at a later date. In other words, when the mobile device of the user who is making the call, starts to stream video, pictures, audio and/or text, or when the user, Dispatcher or the First Responder talk into their devices, or any of them type text into their software applications, this data is sent to the server and permanently stored.

In addition to storing the incoming data, the server also transmits the data to the other people in the call. As an example, when a Dispatcher speaks into the ZAP DISPATCH software then the audio bytes are permanently stored on the ZAP SERVER against this incident. But in addition to storing the audio data, the server also relays the audio data forward to the caller in distress and/or to the First Responder in real time. This provides for the audio communication between parties involved in the incident. A similar method is adopted for text data. The ZAP SERVER basically stores all information received and transmitted, and relays this information to the people involved in the call.

Figure 16:
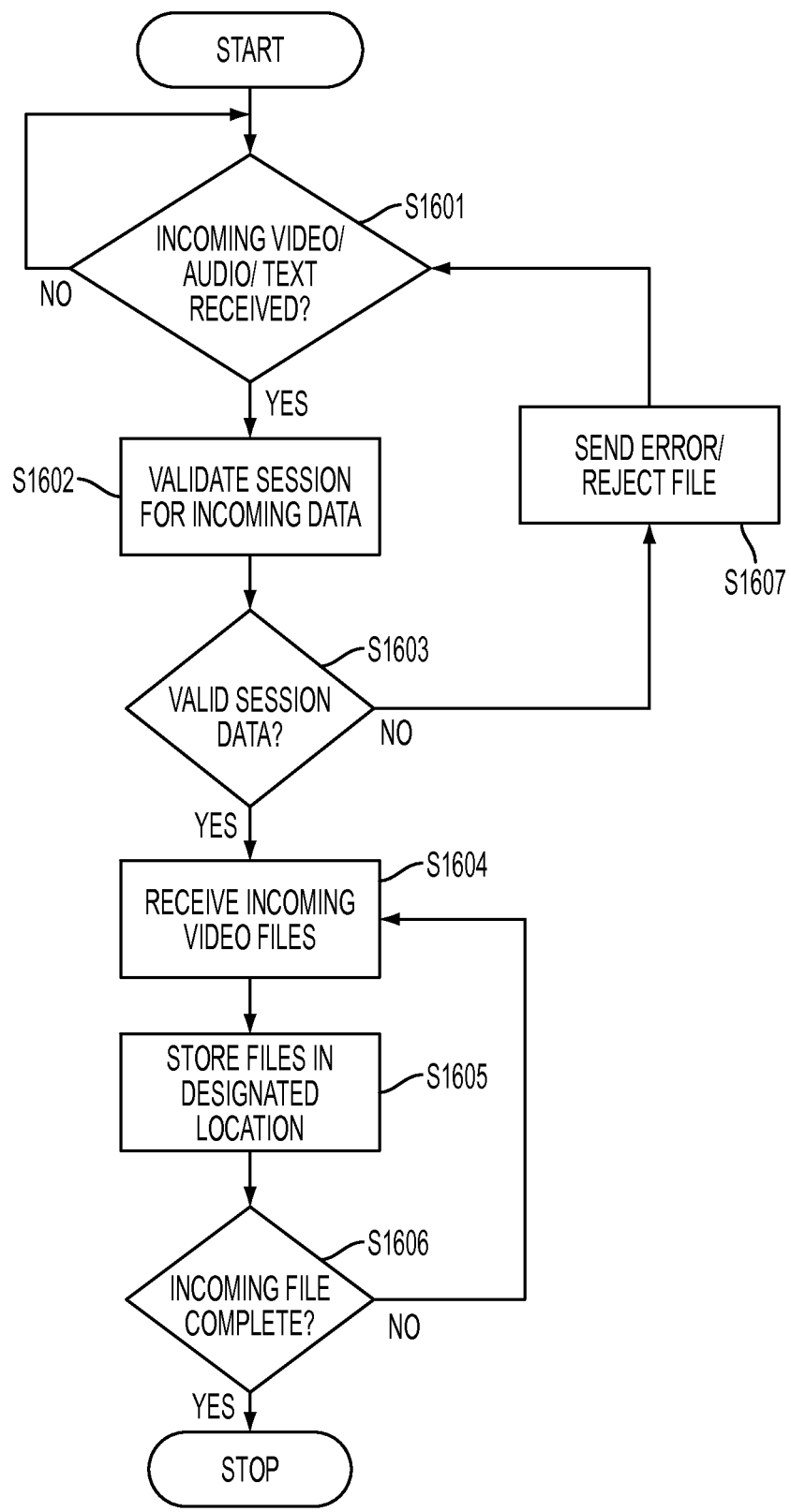
FIG. 16 is a flow diagram of ZAP SERVER receiving incoming information.

FIG. 16 is a flow diagram of ZAP SERVER receiving incoming video, picture, text and audio data on an incident. If an incoming video and/or audio and/or text is received at ZAP SERVER (S1601=YES), then at step S1602, the session for incoming data is validated. If it is a valid session (S1603=YES), then the incoming files are received in step S1604. The files are stored in the designed location in step S1605. If the incoming file is complete (S1606=YES), then processing stops. Otherwise (S1606=NO), processing continues at S1604.

If the data session is not valid (S1603=NO), then an error message is sent and the file and/or incoming information is rejected in step S1607. Processing continues at step S1601.

If no incoming information is received (S1601=NO), processing continues at step S1601.

ZAP SERVER can stream video from the server to the ZAP DISPATCH, ZAPAPP or ZAP FIRST RESPONDER components. ZAP SERVER can also stream video to the ZAP web site. As discussed above, the video that is received from the mobile device of a user for an incident is stored on the ZAP SERVER. If a Dispatcher requests this video, then this video is streamed from the server to the Dispatcher who can see the video in live mode, e.g., real time view, or in recorded mode. In recorded mode, the Dispatcher can go back to the point in time when the video was recorded and play from there.

The same capability is also available to a First Responder and to Safety Group members. The First Responder can stream the video live or in recorded mode on his device, as can the Safety Group members. In other words, ZAP SERVER allows for the video to be streamed from the server to the Dispatcher and/or the First Responder and/or any member in the Safety Group.

Figure 17:
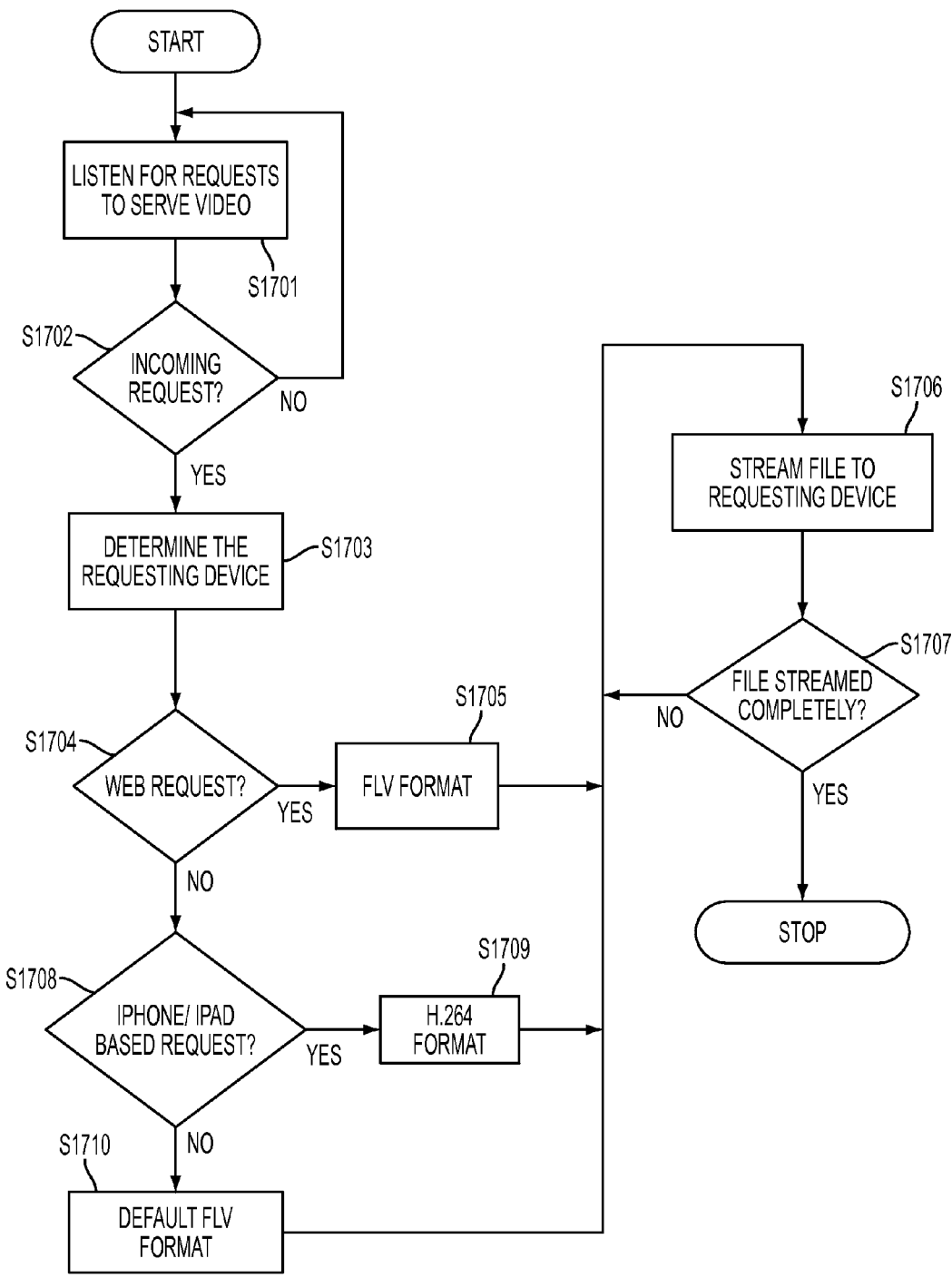
FIG. 17 is a flow diagram of processing on ZAP SERVER to stream video from ZAP SERVER to the requesting device.

FIG. 17 is a flow diagram of the processing on ZAP SERVER to stream video from ZAP SERVER to the requesting device. In step S1701, listen for requests to serve video. If there is an incoming request (S1702=YES), then determine the requesting device in step S1703. If the request is a web request (S1704=YES), then the FLV format is chosen for video transmission in step S1705. The file is streamed to the requesting device in step S1706. If the file is completely streamed (S1707=YES), then the process stops. If the file is not completely streamed (S1707=NO), then processing continues at step S1706.

If the request is not a web request (S1704=NO), then if the request is an iPhone and/or iPad based request (S1708=YES), the H.264 format is chosen in step S1709. Processing continues at step S1706.

If the request is not a web request (S1704=NO) and not an iPhone/iPad based request (S1708=NO), then the default FLV format is chosen in step S1810. Processing continues at step S1706.

If no incoming request is detected (S1702=NO), then processing continues at step S1701.

Figure 18:
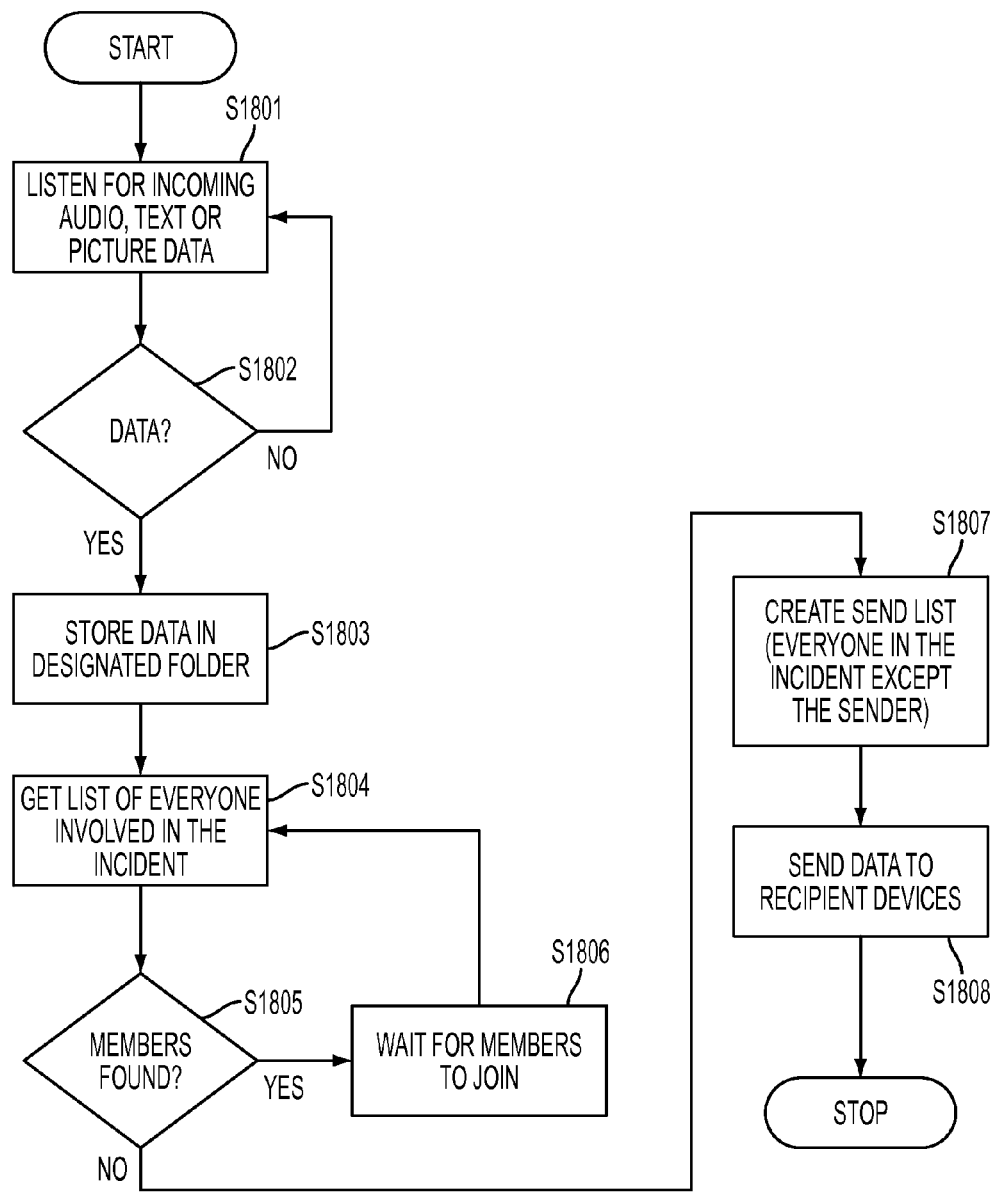
FIG. 18 is a flow diagram of how the audio, text and picture data is sent by ZAP SERVER to users involved in the incident.

FIG. 18 is a flow diagram of how the information, such as audio, text and picture data is sent by ZAP SERVER to the recipient devices, such as, user, Dispatcher, Safety Group members, First Responders, etc., involved in the incident. As shown in FIG. 18, in step S1801, listen for incoming information such as audio, text or picture data. When data is received (S1802=YES), store data in a designated folder in step S1803. In step S1804, get a list of everyone involved in the incident. If there are members in this list (S1805=YES), then wait for the members to join in step S1806 and continue processing at step S1804.

If there are no (or no more) members found (S1805=NO), then create a send list, comprising everyone in the incident except the sender, at step S1807. At step S1808, send the data to the recipient devices.

If no incoming information is received (S1802=NO), processing continues at step S1801.

ZAP SERVER gets an update every fixed number of seconds, for example every 30 seconds, from the mobile device of the First Responders. The data that it receives is the geo-location of the device. This enables ZAP SERVER to keep an updated record regarding where the First Responder is located presently. When an incident is reported, ZAP SERVER goes through the First Responder Location Database and comes up with the list of First Responders in the vicinity of the incident. These are then mapped on the ZAP DISPATCH software for the Dispatcher to forward the incident to the First Responders.

It should be noted here is that the system only keeps track of the present location of the First Responder. It does not keep a log of where the First Responder has been. The intent is not to track the First Responders. The intent is only to keep a record of where they are at the present moment so that alerts can be forwarded to them in an efficient and accurate fashion.

Figure 19:
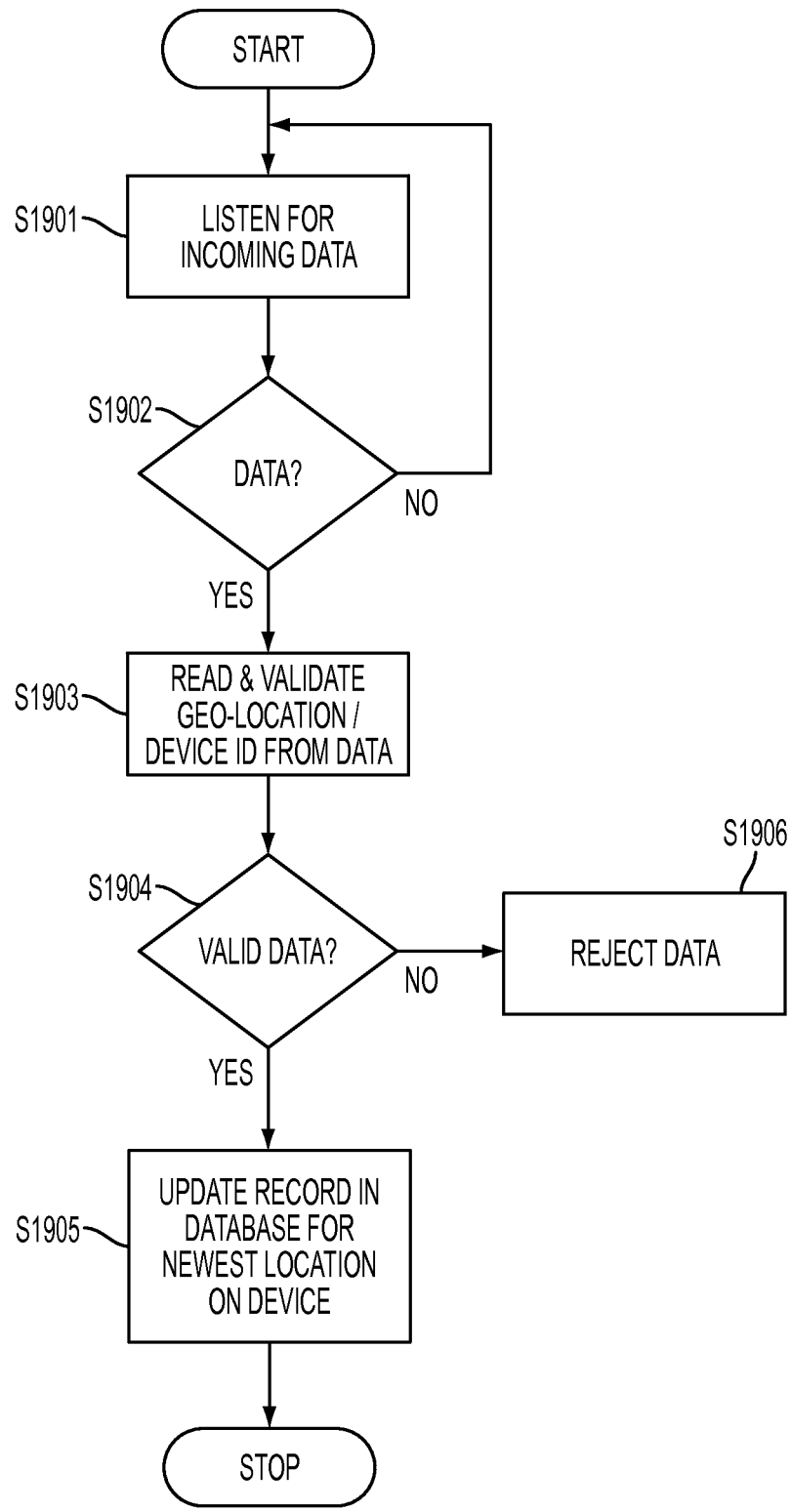
FIG. 19 is a flow diagram of how the geo-location data on the First Responders location is updated on the server.

FIG. 19 is a flow diagram of how the geo-location data on the First Responders location is updated on the server.

In step S1901, listen for incoming data. If data is incoming (S1902=YES), then read and validate the geo-location and/or device id from the incoming data in step S1903. If the data is valid (S1904=YES), then, at step S1905, update the record in the database to be the current location of the device, based on the geo-location. If the data is not valid (S1904=NO), at step S1906 reject the data and resume processing at S1901.

If there is no incoming data (S1902=NO), then listen for incoming data at step S1901.

Once a First Responder gets an alert and the First Responder indicates that he or she will respond to an incident, then ZAP SERVER marks this First Responder as "Engaged in Incident" in the database. Once an incident is completed, the status of the First Responder changes back to available.

When the Dispatcher or the First Responder wishes to view the incident on a map, such as a road map or city map or geographic map, ZAP SERVER provides such a map. Known technologies, such as those available from Google® maps and Bing® maps, can be used. ZAP SERVER can push out a visual map of the area where the incident is happening to the Dispatcher with an overlay of the locations where the First Responders are present. ZAP SERVER can also create a route for the First Responders to get to the destination, for example using standard mapping software.

ZAP SERVER tracks the status of each incident by maintaining a log of all activity on the incident in the ZAP DATABASE. Status of the incident can include Safety Group received the alert, Dispatcher notified of the situation, Dispatcher accepted the alert, Alert forwarded to First Responder, First Responder responding to the situation. Other types of status can also be included.

As discussed above, ZAP SERVER maintains a database including at least all registered users, all incidents, all video for incidents, all images (pictures) for incidents, all audio for incidents, all text messages for incidents, which Dispatcher and/or First Responder responded to the incident, who has seen the video and timestamps on these elements, the timestamps including time of call, time of audio exchange between people, time of text exchange, time of a status change on the incident, etc. Other elements can also be included in this database. This information can be stored on a computer storage device, such as a hard drive, and can be managed using a relational database (RDBMS) system.

ZAP SERVER also maintains a log of all incidents. All information, including visual, picture (image), audio and text exchange for an incident is stored on the server for a fixed period of time.

ZAP DISPATCH includes software that is provided to Dispatchers as a downloadable piece of software that can be obtained via special logins on the ZAP web site, or as prepackaged hardware, or on a CD. The software can include the ability to receive incoming alerts, to preview incoming calls, to accept a call, to reject a call, to merge calls, to "map" incidents, to communicate with the caller via text and/or voice, to forward the incident to the appropriate First Responder(s) and to terminate the call when appropriate. A call can be terminated when it is no longer needed. When an incoming call is accepted by the Dispatcher as a valid emergency situation, the call becomes an "incident".

In addition, in a ZAP PROTECTED COUNTY, the county, city or other governmental agency may wish to install video surveillance cameras. The location of these cameras is provided to or made accessible to the ZAP SERVER. When an Emergency Call comes in, the ZAP SERVER determines the location of the incident and determines if any such cameras are available in the vicinity of the location. If one or more such cameras are available then the video feeds from such cameras are made available to the Dispatcher for viewing.

When a user makes an Emergency Call in a ZAP PROTECTED COUNTY, the signal is sent to the ZAP SERVER which routes the alert to the Dispatcher. The alert is typically sent as an audio visual signal to the computer of the Dispatcher. FIG. 11, discussed above, shows a Dispatcher's screen on which an incoming call is received.

Figure 20:
FIG. 20 is an exemplary screen of a Dispatcher screen after the Dispatcher clicked on the preview button.

The ZAP DISPATCH software allows a Dispatcher to "Preview" the incoming Emergency Call, before accepting it and making it an incident that requires intervention and/or assistance of First Responders. Typically when previewing the calls, the Dispatcher performs "triage" on each call to separate out genuine emergency situations from fake or phony calls. When a Dispatcher receives an incoming call, he or she can click on the "Preview" button on the Dispatcher screen as shown in FIG. 11. This causes live video from the caller's telephone to be displayed on the screen. FIG. 20 shows a Dispatcher screen after the Dispatcher clicked on the preview button. As shown in FIG. 20, the Dispatcher can view live video or click on another section of the screen and view video from the beginning of the call.

The ZAP DISPATCH software allows a Dispatcher to "Accept" an incoming call or alert, usually after he previews it. Accepting a call converts the call or alert to be an incident.

An incident can be forwarded to the appropriate First Responders for action. The Dispatcher can simply click on the accept button on the Dispatcher's screen to accept the incident. The accept button is shown in FIG. 20 on the lower right. All incidents are permanently recorded in the system and can be accessed at any time by the law enforcement agencies and/or First Responders and/or Dispatchers and/or other authorized persons.

In the alternative, the ZAP DISPATCH software allows a Dispatcher to "Reject" an incoming call or alert. For example, if the Dispatcher deems the incident to be a fake or phony call, or a situation that does not warrant action by First Responders, then the Dispatcher can click the Reject button, shown in FIG. 20 on the lower right of the screen. Clicking Reject terminates the call but does not stop the video from being recorded on the ZAP SERVER from the caller's mobile device. It only means that the Dispatcher will not participate in the situation. When the Dispatcher clicks Reject, a notification is sent to the caller.

The ZAP DISPATCH software allows a Dispatcher to "Merge" an incoming alert with one or more other incidents. For example, if two users simultaneously send out a distress signal from a situation, e.g., traffic accident, bank robbery, etc., then the Dispatcher may be presented with two vantage points. This may be helpful and/or important to the Dispatcher as having more than one vantage point may give further clarity regarding the gravity of the situation. When the Dispatcher gets the first call and converts it to an incident, the ZAP DISPATCH software will allow the Dispatcher to continue to receive incoming calls and alerts and to preview other alerts. If a new incoming call is recognized as an alert that is from the same situation, then the Dispatcher can merge the two alerts by adding the new alert to the matching incident. The Dispatcher can simply click on the merge button to merge the incident. The merge button is shown in FIG. 20 on the lower right of the screen.

The ZAP DISPATCH software allows a Dispatcher to view live feeds from ZAP CAMERAS in the vicinity of the incident location. The video feed can be viewed live and the Dispatcher may also go back in time if it makes sense in the context of the incident. As an example, if an accident is reported via the ZAPAPP and a camera is available to the Dispatcher, then the Dispatcher may choose to view the live feed from the camera, and/or go back in time and select the few seconds that actually show how the accident took place. These few seconds of video can be "extracted" and then attached to the incident. This attached video can be viewed by the First Responders.

In another example, if a fire is being reported, the Dispatcher may have a camera available to him in the vicinity and may choose to attach the live feed from this camera for the First Responders. In this situation, the First Responders can benefit from a live view of what is occurring at present against an extracted clip from the past.

Figure 21:
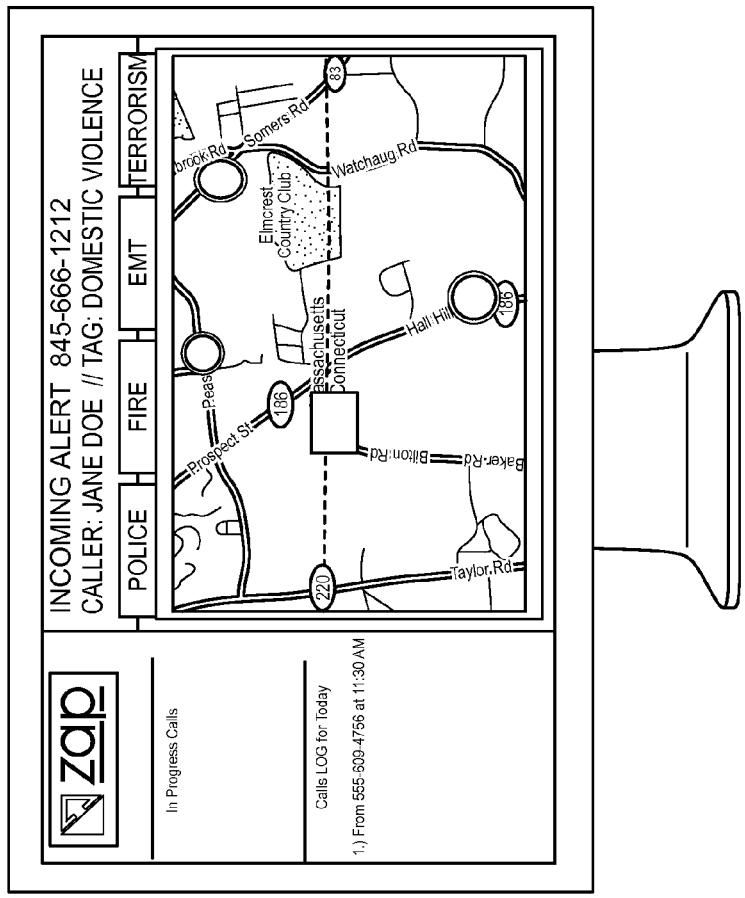
FIG. 21 is an exemplary screen of a Dispatcher screen with a map of the incident.

The ZAP DISPATCH software allows a Dispatcher to "MAP" incidents, such that the Dispatcher can click on the "Map It" button (shown on FIG. 20) and see not only the location of the incident on a map, but also see the position of the First Responders in the proximity of the incident. This allows the Dispatcher to determine where the incident is located and who the closest First Responders are. The Dispatcher can then pass on the incident information to the First Responders simply by clicking on their "icons" in the map. FIG. 21 is a Dispatcher screen with a MAP including the incident. As shown in FIG. 21, the rectangle indicates where the incident is taking place and the circular dots show the First Responders near the incident. This is an example screen illustrating how a Dispatcher can "MAP" an incident and get to see where the First Responders in the vicinity of the incident are located.

The ZAP DISPATCH software allows a Dispatcher to communicate with the caller in one embodiment. The information exchange can occur either as voice or text. A Dispatcher can communicate via voice simply by talking into the microphone attached to his computer. Whatever he says will be sent to the caller's mobile device using simple voice exchange protocols, such as those available on the internet. However, a user who is calling may be in a situation where he cannot be talking. In such a scenario, the user can select the "Stealth" option during the call, typically by clicking on the Stealth button in the ZAPAPP. If the user selects this option then the Dispatcher is shown that the user is in stealth mode and does not wish to communicate via voice. In that scenario, the Dispatcher has the option to communicate via text only.

The Dispatcher can communicate via text simply by typing in the chat window and clicking on the send button. FIG. 20 shows a chat button that can be used in one embodiment to initiate text communication. In addition to simple chat or texting, ZAP also provides a translation feature by which the transcript can be translated into multiple languages for communicating with users who may or may not be well versed in English or any other language depending on the country where the system is implemented.

In most cases, the information, e.g., voice and/or text data, is simply packetized and transmitted over the internet or 3G/4G or other available cellular network to the recipient's mobile device. For example, TCP/IP protocols are available for such data transfer.

The ZAP DISPATCH software allows the Dispatcher to forward the incident to a First Responder simply by clicking on his icon from the MAP. The ZAP SERVER tracks the mobile devices that are given to the First Responders. Once an incident is reported, the ZAP SERVER software tracks the location of the incident and then "sweeps" a radius around the incident for any ZAP FIRST RESPONDER devices near the incident. This sweep radius varies from county to county and can be determined by the population density of the county. In one embodiment, two mile, five mile and ten mile radius circles are used. The ZAP DISPATCH software is equipped to receive the click from the MAP and identify the First Responder who is carrying that device. The alert for the incident is then sent to the mobile device of the First Responder who is being notified by the Dispatcher, typically by using PUSH notification or SMS messaging.

Once an alert is received from the MAP on the ZAP DISPATCH software, the ZAP SERVER then forwards the alert to the appropriate device of the First Responder that is being notified by the Dispatcher. This alert will show up on the screen of the First Responder as described with respect to the ZAP FIRST RESPONDER as discussed below.

The ZAP DISPATCH software allows the Dispatcher to terminate the call, that is, close the call at his end. The video recording from the mobile device may still continue on the ZAP SERVER, but the Dispatcher will not be a part of the call after he terminates. One example of a situation in which a call may be terminated can be when the Dispatcher previews the call and thinks it is not a call that needs any intervention from a First Responder. Another example is when the Dispatcher has passed the call along to the First Responder who is responding to the situation. The Dispatcher at this point may choose to terminate the call at his end to focus on new incoming calls. In addition, a call may be terminated by the Dispatcher or the First Responder when the video from the situation is no longer needed, or when communication with the caller is no longer necessary.

However, the video recording from the situation will continue on the ZAP SERVER until the user who initiated the call ends the call from his mobile device. This is done to protect the user. By way of an example, if a user is in a situation that is potentially dangerous but is not a 911 or emergency situation yet, if the Dispatcher is watching the video of this call and determines that he doesn't need to get a First Responder involved, the Dispatcher may terminate the call at his end. But later on, for example after two minutes, something happens that makes the situation a 911 or emergency incident. If the Dispatcher is involved in this again, then he should get to see the live video as well as the prior video to see what actually happened. Keeping this in mind, the ZAP SYSTEM is designed in such a way that the Dispatcher or the First Responder can terminate the call at their end at any time but the actual recording of the call on the ZAP SERVER terminates only once the user decides to end the call from his mobile device.

ZAP FIRST RESPONDER software is designed for a large variety of mobile devices, such as iPads or ANDROID®-based tablets. Different versions for ZAP FIRST RESPONDER may be available to different counties. Some counties may choose to buy iPad-based devices while others may choose to buy ANDROID®-based, Windows®-based, Google® Chrome-based, Amazon® Kindle®-based or Blackberry® Notebook-based versions. Additional technologies for other devices can also be used.

The functionality of the ZAP FIRST RESPONDER software includes Receive Incoming Alerts, View Alerts, View Incidents, Request Backups, Provide Geo-location to the server, Communicate with the Dispatcher and/or user based on voice and/or text data, Map the incident's location and Terminate the call.

The ZAP FIRST RESPONDER software can receive alerts of incidents from the Dispatchers and display them on the mobile devices of the First Responders. An alert can be sent to a First Responder by the Dispatcher simply by clicking on the icon of the First Responder from the map in the ZAP DISPATCH software. Once the icon is clicked, the ZAP SERVER receives that click and sends a notification or alert for the incident to the appropriate First Responder.

Figure 22:
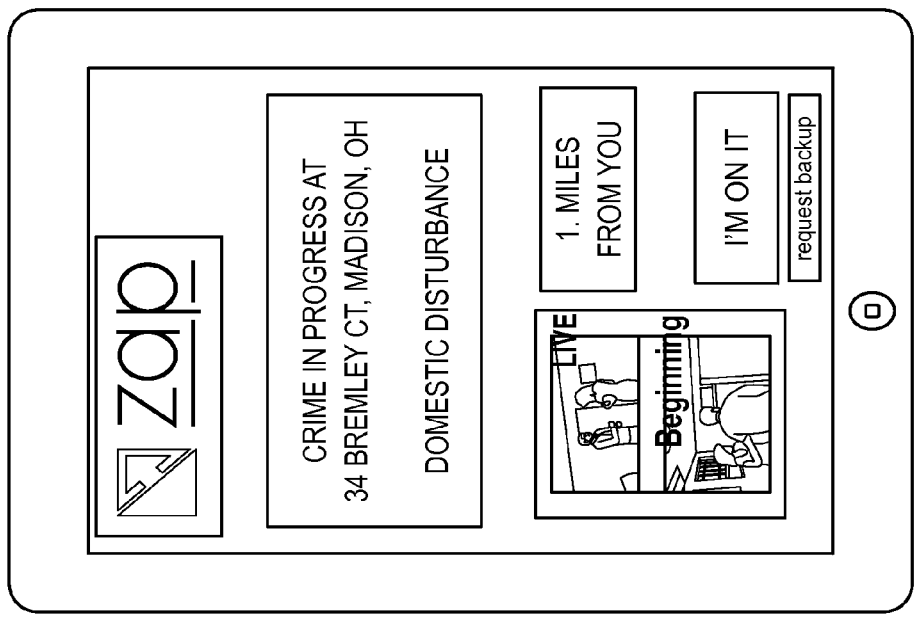
FIG. 22 is an exemplary screen of how the alert looks on the mobile device of the First Responder.

FIG. 22 is an exemplary screen showing how the alert looks on the mobile device of the First Responder. This is an example of a Police Officer's mobile device of an iPAD. The software would look different for Fire, EMT or other First Responders.

The ZAP FIRST RESPONDER software allows the First Responder to view the video of the incident both in real time and from the beginning of the user's call reporting the alert. The First Responders may be interested in what is currently happening with respect to the incident, or they may be interested in what happened from the beginning of the user's call. Both options are available as shown, for example, in the lower left portion of FIG. 22. Any video clip that was attached to the incident by the Dispatcher (e.g. a clip extracted from the ZAP CAMERAS as described above) can also be viewed by the First Responders.

A First Responder can decide to respond to an incident by clicking the "I'm on it" button from the mobile device, as shown in FIG. 22. Other text can be used on the button indicating response to the incident. Accepting an incident results in the following activities. The ZAP SERVER is notified that a First Responder is responding to the incident. The ZAP SERVER sends a message to the Dispatcher along with the name of the First Responder who is responding to the incident. If the Dispatcher had sent the same alert to many First Responders then the rest of the First Responders are also sent a notification that the incident was responded to by a First Responder. The notification can include the name of the responder and/or his classification, such as police sergeant, fireman, etc. This can prevent more than one officer responding to the same incident. In addition, a notification is sent to the ZAPAPP screen of the caller to show him that a First Responder is on the way. This provides a level of security to the caller in distress.

Figure 23:
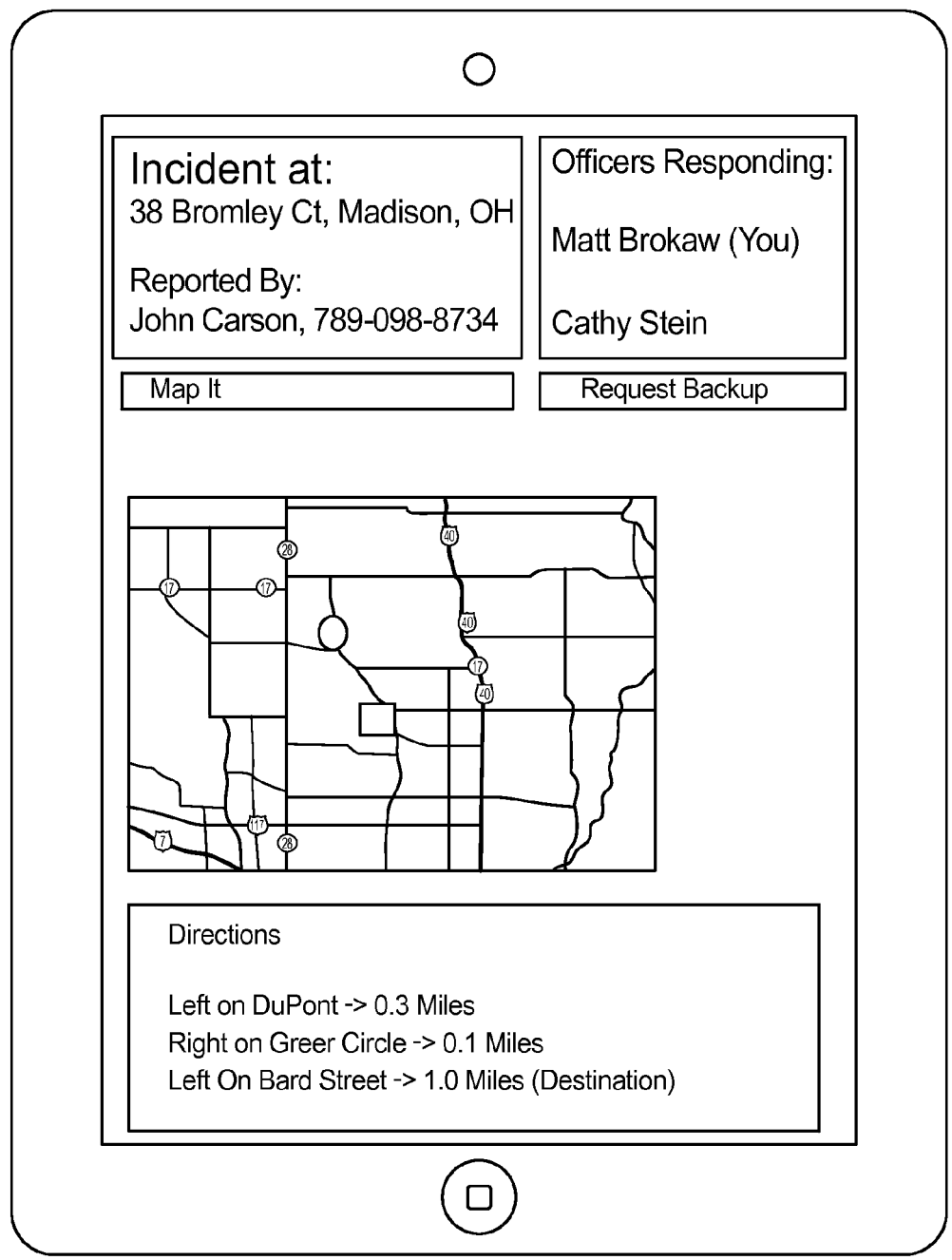
FIG. 23 is an exemplary screen of a police First Responder screen when they see the incident on the map and obtain directions to the incident.

ZAP FIRST RESPONDER allows a First Responder to request backup. For example, while viewing the video, the situation may change and the First Responder may feel that he would require some assistance and backup in this incident. In one embodiment, clicking on the "Request Backup" button, as shown in FIG. 23, requests backup. Other methods of requesting backup can also be used. Requesting backup, for example by clicking on the "request backup" button, sends an alert to the ZAP SERVER which in turn sends an alert to the Dispatcher and to the other First Responders in the vicinity of the incident who have not responded to the incident.

By way of an example, consider that an incident was forwarded to ten First Responders' devices. Two of the First Responders respond to the incident. If either of these two First Responders makes a request for backup, then the ZAP SERVER sends an alert to the Dispatcher and the remaining eight First Responders in the vicinity.

The ZAP FIRST RESPONDER software periodically sends the geo-location of the mobile device which it is installed on to the server. In one embodiment, the geo-location is sent from the ZAP FIRST RESPONDER device to the server every thirty seconds. Other time periods can be used, as appropriate. In the alternative, the server can be informed of the First Responder device location in accordance with other criteria, such as when the device is moved, when it is turned on, etc. The server only keeps a record of where the device is at the current time. It does not keep a log of where the device has been; only the latest position is recorded.

In case of an incident, the ZAP SERVER compares the location of the incident with the location of the First Responders in the area and comes up with a list of First Responders of a particular type (police, fire, EMT, etc.) who are within a given distance of the incident. This is called sweep radius and will be different for different counties. For example, in a county in a city like New York or Chicago, Ill., a sweep radius of one mile may be sufficient, whereas in a county in a city like Westcreek, Colo., a sweep radius of up to five miles may be used. The sweep radius is a function of the population density and the First Responders' density in an area or county.

The ZAP FIRST RESPONDER software allows a First Responder to communicate with the Dispatcher, other First Responders and/or the user in distress. This communication can be voice-based, such that the First Responder speaks into the mobile device and his voice is sent to the other people, e.g., Dispatcher, other First Responder(s), user, involved in the call. This communication can also be text, such that the First Responder types in the chat window of his device and the text is relayed to everyone, e.g., other First Responders, user, Dispatcher, in the call. In addition, the First Responder can send out general messages that can be read by anyone or he can send the message out only to Dispatcher, and/or other First Responders selectively.

The ZAP FIRST RESPONDER software allows a First Responder to map the incident. This screen can be initiated by clicking on the MAP IT button available to the First Responders on their screens. This can provide the First Responder with the shortest route to get to the incident. In one embodiment, traffic advisories along with the routes to the destination can be integrated into the software.

FIG. 23 shows an exemplary screen of a police First Responder screen when they see the incident on the map. This can enables the First Responder to get directions to the incident.

The ZAP FIRST RESPONDER software allows a First Responder to stop getting the video from the incident by clicking on the "Terminate Call" button from the screens available to him. The "Terminate" option only stops the incident from being streamed to the mobile device of the First Responder. It does not stop the recording from the device of the caller onto ZAP SERVER. The First Responder can always "Join" the incident again if it is available by going into the call logs.

Thus, when a First Responder reaches the incident and prepares to take control of the situation, he may want to opt out of the call and focus on the situation at hand. Accordingly, he can opt out of, or terminate, the call without interrupting or halting the recording from the device of the caller. Hence, the Dispatcher and First Responders can view a continuous stream, not just initial alerts as in traditional 911 systems.

The novel system can operate with the following protocols: SOCKETS, HTTP Uploads, RTP, RTSP, RTMP, and/or MQTT. Other protocols for communication, transfer and receipt of data may also be used. Methods of transmission of information in the inventive system can include FTP, Messaging, Secure Sockets, Secure HTTP, Secure FTP, Secure Messaging server protocols, Secure RTP, Secure RTSP, and/or Secure RTMP.

Various aspects of the present disclosure may be embodied as a program, software, or computer instructions embodied or stored in a computer or machine usable or readable medium, which causes the computer or machine to perform the steps of the method when executed on the computer, processor, and/or machine. A program storage device readable by a machine, e.g., a computer readable medium, tangibly embodying a program of instructions executable by the machine to perform various functionalities and methods described in the present disclosure is also provided.

The system and method of the present disclosure may be implemented and run on a general-purpose computer or special-purpose computer system. The computer system may be any type of known or will be known systems and may typically include a processor, memory device, a storage device, input/output devices, internal buses, and/or a communications interface for communicating with other computer systems in conjunction with communication hardware and software, etc. The system also may be implemented on a virtual computer system, colloquially known as a cloud.

The computer readable medium could be a computer readable storage medium or a computer readable signal medium. Regarding a computer readable storage medium, it may be, for example, a magnetic, optical, electronic, electromagnetic, infrared, or semiconductor system, apparatus, or device, or any suitable combination of the foregoing; however, the computer readable storage medium is not limited to these examples. Additional particular examples of the computer readable storage medium can include: a portable computer diskette, a hard disk, a magnetic storage device, a portable compact disc read-only memory (CD-ROM), a random access memory (RAM), a read-only memory (ROM), an erasable programmable read-only memory (EPROM or Flash memory), an electrical connection having one or more wires, an optical fiber, an optical storage device, or any appropriate combination of the foregoing; however, the computer readable storage medium is also not limited to these examples. Any tangible medium that can contain, or store a program for use by or in connection with an instruction execution system, apparatus, or device could be a computer readable storage medium.

The terms "computer system" and "computer network" as may be used in the present application may include a variety of combinations of fixed and/or portable computer hardware, software, peripherals, and storage devices. The computer system may include a plurality of individual components that are networked or otherwise linked to perform collaboratively, or may include one or more stand-alone components. The hardware and software components of the computer system of the present application may include and may be included within fixed and portable devices such as desktop, laptop, and/or server, and network of servers (cloud). A module may be a component of a device, software, program, or system that implements some "functionality", which can be embodied as software, hardware, firmware, electronic circuitry, or etc.

The terms "click" and "click on" as may be used in the present application may include a variety of techniques for input, such as touching the screen, pressing with a stylus device, announcing voice command and other known methods.

The embodiments described above are illustrative examples and it should not be construed that the present invention is limited to these particular embodiments. Thus, various changes and modifications may be effected by one skilled in the art without departing from the spirit or scope of the invention as defined in the appended claims.

What is claimed is:

1. A system for reporting and monitoring an incident using a mobile device, comprising:
   a server having a CPU, the server operable to bi-directionally communicate with the mobile device and bi-directionally communicate with one or more dispatchers;
   the server further operable to:
   receive notice of an incident from the mobile device, authenticate log-in of the mobile device, and determine characteristics of the mobile device;
   establish bi-directional communication with the mobile device and the one or more dispatchers in response to the notice of and authentication of the mobile device, the bi-directional communication comprising live video being streamed at the same time as the video of the incident is being captured; and
   route and record bi-directional communication regarding the incident between the authenticated mobile device and the one or more dispatchers.

2. The system according to claim 1, the server further operable to transmit the notice of the incident to a safety group associated with the log-in of the mobile device and route bi-directional communication between the mobile device and the safety group, and record, at the server, the bi-directional communication regarding the incident from the mobile device to the server, wherein at least one of the mobile device and the log-in of the mobile device is registered with the system.

3. The system according to claim 1, the server further operable to:
   bi-directionally communicate regarding the incident with one or more first responders;
   select a dispatcher from the one or more dispatchers in accordance with the characteristics of the mobile device and request approval from the selected dispatcher to communicate with the mobile device regarding the incident;

route and record the bi-directional communication between the mobile device and the selected dispatcher when the selected dispatcher provides approval;

request response from each of the first responders to bi-directionally communicate with the mobile device regarding the incident and for each first responder providing the response, route and record the bi-directional communication regarding the incident between the mobile device and the first responder and between the selected dispatcher and the first responder; and when the selected dispatcher does not provide approval, send a message to the mobile device and record, at the server, communication from the mobile device to the server.

4. The system according to claim 3, the characteristics of the mobile device comprising at least one of a geographic location, a user log-in, and a device identification number, and the server further operable to prepare and maintain a map of the geographic location of the mobile device and the first responders, and to select the first responders from the map.

5. The system according to claim 3, wherein the communication between the server and the mobile device is performed using one or more of an internet and a cellular network, the communication between the server and the first responders is performed using one or more of an internet and a cellular network, the communication between the server and the dispatcher is performed using the internet and the communication between the server and the safety group is performed using one or more of an internet and a cellular network.

6. The system according to claim 3, wherein the bi-directional communication regarding the incident comprises one or more of audio, images, text, data in encrypted form and data in unencrypted form.

7. The system according to claim 3, the server further operable to identify one or more cameras in the vicinity of the incident, and to communicate video feed from the one or more identified cameras to one or both of the selected dispatcher and the selected first responders.

8. A system for reporting and monitoring an incident using a mobile device comprising:
a dispatcher module on a CPU, the module operable to:
bi-directionally communicate with a server having a CPU, the server operable to bi-directionally communicate with the mobile device and the mobile device operable to bi-directionally communicate with the server, the bi-directional communication comprising live video being streamed at the same time as the video of the incident is being captured, the server further operable to receive notice of an incident from the mobile device, authenticate the mobile device,
provide approval to the server for the dispatcher to receive bi-directional communication between the mobile device and the server,
receive, from the server, video feed from one or more cameras in the vicinity of the incident; and
request the server to extract video clips from the live video or the video feed from the one or more cameras in the vicinity of the incident.

9. The system according to claim 8, the dispatcher module further operable to:
view data describing the user of the mobile device, the data comprising one or more of user name, user address, user emergency contacts, user safety group names and telephone numbers and user emergency notes,
request the server to remotely activate a camera on the mobile device,
view one or more first responders in the vicinity of the user of the mobile device on a map of the geographic location of the mobile device and the first responders,
select one or more of the one or more first responders viewed on the map,
communicate with the selected one or more first responders,
obtain a visual acknowledgement of response to incident by one or more of the first responders,
request the server to send the extracted video clips to the selected first responders, and
provide translation of one or both of audio and text obtained from the mobile device.

10. The system according to claim 8, each first responder further operable to:
view data describing the user of the mobile device, the data comprising one or more of user name, user address, user emergency contacts, user safety group names and telephone numbers and user emergency notes, and
view one or more of video clips and camera feeds received from the server and requested by the dispatcher.

11. A method for using a mobile device to report and monitor an incident, comprising steps of:
receiving notice of an incident from the mobile device, authenticating log-in of the mobile device, and determining characteristics of the mobile device,
establishing bi-directional communication with the mobile device and the one or more dispatchers, the bi-directional communication comprising live video being streamed at the same time as the video of the incident is being captured, and
routing and recording bi-directional communication regarding the incident between the authenticated mobile device and the one or more dispatchers.

12. The method according to claim 11, further comprising:
registering at least one of the mobile device and the log-in of the mobile device,
transmitting the notice of the incident to a safety group associated with the log-in of the mobile device and routing bi-directional communication between the mobile device and the safety group, and
recording the bi-directional communication regarding the incident from the mobile device.

13. The method according to claim 11, further comprising steps of:
bi-directionally communicating regarding the incident with one or more first responders,
selecting a dispatcher from one or more dispatchers in accordance with the characteristics of the mobile device and requesting approval from the selected dispatcher to communicate with the mobile device regarding the incident,
routing and recording the bi-directional communication between the mobile device and the selected dispatcher when the selected dispatcher provides approval,
requesting response from each of the first responders to bi-directionally communicate with the mobile device regarding the incident and for each first responder providing the response, routing and recording the bi-directional communication regarding the incident between the mobile device and the first responder and between the selected dispatcher and the first responder, and
when the selected dispatcher does not provide approval, sending a message to the mobile device and recording communication from the mobile device to a server.

14. The method according to claim 13, wherein the characteristics of the mobile device comprise at least one of a geographic location, a user log-in, and a device identification number, and the steps further comprise preparing and maintaining a map of the geographic location of the mobile device and the first responders, and selecting the first responders from the map.

15. The method according to claim 13, further comprising steps of:
   registering at least one of the mobile device and the login of the mobile device;
   sending the notice of the incident;
   logging in the mobile device;
   streaming the live video at the same time as the video of the incident is being captured; and
   bi-directionally communicating with the one or more dispatchers.

16. The method according to claim 13, wherein the step of bi-directionally communicating regarding the incident communicates information comprising one or more of audio, images, text, data in encrypted form and data in unencrypted form, and
   wherein the step of bi-directional communicating is performed using one or more of an internet and a cellular network.

17. The method according to claim 13, further comprising identifying one or more cameras in the vicinity of the incident, and communicating video feed from the one or more identified cameras to one or both of the selected dispatcher and the selected first responders.

18. The method according to claim 17, further comprising extracting video clips from the live video or the video feed from the one or more identified cameras in the vicinity of the incident.

19. The method according to claim 18 further, comprising steps of:
   bi-directionally communicating with a dispatcher selected from one or more dispatchers in accordance with characteristics of the mobile device,
   providing approval from the selected dispatcher to communicate with the mobile device regarding the incident,
   viewing data describing the user of the mobile device, the data comprising one or more of user name, user address, user emergency contacts, user safety group names and telephone numbers and user emergency notes,
   remotely activating a camera on the mobile device,
   viewing first responders in the vicinity of the user of the mobile device on a map of the geographic location of the mobile device and the first responders,
   selecting one or more of the one or more first responders viewed on the map,
   communicating with the selected one or more first responders,
   obtaining a visual acknowledgement of response to incident by one or more of the first responders,
   sending the extracted video clips to the selected one or more first responders, and
   providing translation of one or both of audio and text obtained from the mobile device.

20. The method according to claim 19, further comprising steps of:
   viewing, by each first responder, data describing the user of the mobile device, the data comprising one or more of user name, user address, user emergency contacts, user safety group names and telephone numbers and user emergency notes, and
   viewing, by each first responder, one or more of video clips and camera feeds received from the server and provided by the dispatcher.

21. A non-transitory computer readable storage medium storing a program of instructions executable by a machine to perform a method for reporting and monitoring incidents, comprising:
   receiving notice of an incident from the mobile device, authenticating log-in of the mobile device, and determining characteristics of the mobile device,
   establishing bi-directional communication with the mobile device and the one or more dispatchers, the bi-directional communication comprising live video being streamed at the same time as the video of the incident is being captured; and
   routing and recording communication between the mobile device and the one or more dispatchers, the bi-directional communication comprising live video.

22. The non-transitory computer readable storage medium according to claim 21, further comprising:
   transmitting the notice of the incident to a safety group associated with the log-in of the mobile device and routing bi-directional communication between the mobile device and the safety group,
   recording the bi-directional communication regarding the incident from the mobile device to the server, and
   registering at least one of the mobile device and the log-in of the mobile device.

23. The non-transitory computer readable storage medium according to claim 21, further comprising:
   bi-directionally communicating regarding the incident with one or more first responders,
   selecting a dispatcher from the one or more dispatchers in accordance with the characteristics of the mobile device and requesting approval from the selected dispatcher to communicate with the mobile device regarding the incident,
   routing and recording bi-directional communication between the mobile device and the selected dispatcher when the selected dispatcher provides approval,
   requesting response from each of first responders to bi-directionally communicate with the mobile device regarding the incident and for each first responder providing the response, routing and recording the bi-directional communication regarding the incident between the mobile device and the selected first responder and between the selected dispatcher and the first responder, and
   when the selected dispatcher does not provide approval, sending a message to the mobile device and recording, at the server, communication from the mobile device to the server.

24. The non-transitory computer readable storage medium according to claim 23, wherein the characteristics of the mobile device comprise at least one of a geographic location, a user log-in, and a device identification number, and the steps further comprise preparing and maintaining a map of the geographic location of the mobile device and the first responders, and selecting the first responders from the map.

25. The non-transitory computer readable storage medium according to claim 23, wherein bi-directionally communicating is performed using one or more of an internet and a cellular network.

26. The non-transitory computer readable storage medium according to claim 23, wherein the bi-directionally communicating regarding the incident communicates information comprising one or more of audio, images, text, data in encrypted form and data in unencrypted form.

27. The non-transitory computer readable storage medium according to claim 23, further comprising identifying one or more cameras in the vicinity of the incident, and communicating video feed from the one or more identified cameras to one or both of the selected dispatcher and the selected first responders.

28. The non-transitory computer readable storage medium according to claim 27, further comprising extracting video clips from the live video or the video feed from the one or more identified cameras in the vicinity of the incident.

29. The system according to claim 1, further comprising a module on the mobile device to enable the mobile device to bi-directionally communicate with the server and the one or more dispatchers, to transmit the notice of the incident to the server, to stream the live video to the server, to log-in the mobile device to the server, and to register the mobile device for authentication of the log-in of the mobile device.

30. The system according to claim 8, further comprising a module on the mobile device to enable the mobile device to bi-directionally communicate with the server and the dispatcher, to transmit the notice of the incident to the server, to stream the live video to the server, to log-in the mobile device to the server, and to register the mobile device for authentication of the log-in of the mobile device.

\* \* \* \* \*